(12) United States Patent
Jeong et al.

(10) Patent No.: US 8,195,855 B2
(45) Date of Patent: Jun. 5, 2012

(54) BI-DIRECTIONAL MULTI-DROP BUS MEMORY SYSTEM

(75) Inventors: Deog-Kyoon Jeong, Seoul (KR); Suhwan Kim, Seoul (KR); Woo-Yeol Shin, Seoul (KR); Dong-Hyuk Lim, Seoul (KR); Ic-Su Oh, Gyeonggi-do (KR)

(73) Assignees: Hynix Semiconductor Inc., Gyeonggi-do (KR); Seoul National University Industry Foundation, Seoul (KR)

( * ) Notice: Subject to any disclaimer, the term of this patent is extended or adjusted under 35 U.S.C. 154(b) by 439 days.

(21) Appl. No.: 12/477,545

(22) Filed: Jun. 3, 2009

(65) Prior Publication Data
US 2009/0313410 A1    Dec. 17, 2009

(30) Foreign Application Priority Data
Jun. 12, 2008  (KR) .................. 10-2008-0055220

(51) Int. Cl.
*G06F 13/00* (2006.01)
*G05F 3/16* (2006.01)
*H03K 17/16* (2006.01)

(52) U.S. Cl. .......... 710/100; 323/224; 323/306; 326/21; 326/26; 326/30; 326/82

(58) Field of Classification Search .......... 710/100; 323/224, 316; 326/21, 26, 30, 82
See application file for complete search history.

(56) References Cited

U.S. PATENT DOCUMENTS

| | | | |
|---|---|---|---|
| 6,125,419 A * | 9/2000 | Umemura et al. ........... 710/110 |
| 6,441,638 B2 * | 8/2002 | Osaka et al. ................. 326/30 |
| 6,563,076 B1 | 5/2003 | Benjamin et al. |
| 6,766,404 B1 * | 7/2004 | Osaka et al. ................ 710/306 |
| 6,812,741 B2 * | 11/2004 | Shibata et al. .............. 326/82 |
| 6,937,111 B2 * | 8/2005 | Kwon ........................ 333/100 |
| 6,983,023 B2 * | 1/2006 | Osaka et al. ............... 375/257 |
| 7,068,065 B1 | 6/2006 | Nasrullah |
| 7,164,287 B2 | 1/2007 | Ueno |
| 7,254,066 B2 * | 8/2007 | Lee ........................... 365/191 |
| 7,538,573 B2 * | 5/2009 | Kim et al. .................. 326/30 |
| 7,646,212 B2 * | 1/2010 | Sung et al. ................. 326/30 |
| 2003/0124989 A1 | 7/2003 | Kwon |
| 2006/0290377 A1 * | 12/2006 | Kim et al. .................. 326/30 |

FOREIGN PATENT DOCUMENTS

| JP | 07-321828 | 12/1995 |
|---|---|---|
| JP | 2001-007742 | 1/2001 |
| JP | 2008-0182516 | 8/2008 |

OTHER PUBLICATIONS

Notice of Allowance issued from Korean Intellectual Property Office on Jan. 28, 2010.
"Digital Systems Engineering", pp. 106-109, William J. Dally et al., Cambridge University Press, 1998.

* cited by examiner

*Primary Examiner* — Brian Misiura
(74) *Attorney, Agent, or Firm* — IP & T Group LLP

(57) ABSTRACT

A bus system includes a plurality of stubs; a plurality of connectors, each of which is serially coupled between a corresponding one of the stubs and a corresponding one of memory modules; a plurality of first serial loads, each of which is serially coupled to a corresponding one of the connectors; and a plurality of second serial loads, each of which is serially coupled to characteristic impedance of a transmission line of a corresponding one of the stubs, wherein the first and the second serial loads are determined to be impedance matched at each transmission line terminal of the stubs.

22 Claims, 20 Drawing Sheets

1st symbol transmission

Reflection occurs

2nd symbol transmission

Inter symbol interference

RLGC model

| L (H/m) | C (F/m) | R (Ω/m) | G (S/m) |
|---|---|---|---|
| $3.0514 \times 10^{-7}$ | $1.2951 \times 10^{-10}$ | $2.7268 + 8.4094 \times 10^{-4} \sqrt{f}$ | $3.3358 \times 10^{-9} + 1.8854 \times 10^{-11} \times f$ |

Connector model

0　　　　　　#1　　　　　　#2　　　　　　#3

0　　　　　　#1　　　　　　#2　　　　　　#3

0    #1    #2    #3

0    #1    #2    #3

0  #1  #2  #3

0  #1  #2  #3

BI-DIRECTIONAL MULTI-DROP BUS MEMORY SYSTEM

CROSS-REFERENCE TO RELATED APPLICATION

The present invention claims priority of Korean patent application number 10-2008-0055220, filed on Jun. 12, 2008, the disclosure of which is incorporated herein by reference in its entirety.

BACKGROUND OF THE INVENTION

The present invention relates to a bi-directional multi-drop bus system, and a memory module and a memory system using the bi-directional multi-drop bus system.

As the semiconductor fabrication method and the circuit design technique have improved, the bandwidth of the dynamic random access memory (DRAM) has been considerably increased and the data transmission method also has been continuously improved. The increase of the bandwidth influences the direct effect to the operation speed of the input/output (I/O) interface circuit. The operation speed of the I/O interface circuit is determined by the signal integrity of the data channel and the timing margin of the I/O interface circuit.

On the basis of the transmission speed per pin, the bandwidth of memory systems such as a synchronous dynamic random access memory (SDRAM) and double data rate (DDR) 1/2/3 SDRAMs having a multi-drop bus system have been developed in order of 166 Mbps, 333 Mbps, 400 Mbps, 800 Mbps, and 1600 Mbps. The memory systems of SDRM and DDR 1/2/3 SDRAMs have been employed the stub series terminated logic (SSTL) for improving the signal integrity. The SSTL method is the I/O signaling method including Z0/2 stubs resistor. The conventional memory systems employing the SSTL have the problem of the reflected wave induced by the impedance mismatch in the stub. The reflected wave causes the inter symbol interference (ISI). The reflected wave causing the ISI can seriously damage the signal integrity and, thus, it is impossible to implement the memory systems of the large bandwidth, e.g., greater than 2 Gbps.

FIGS. 1A to 1D are diagrams for explaining the concept of the SSTL employed by the conventional memory systems having a multi-drop bus system.

As shown in FIG. 1A, a first signal SIG1 from a memory controller not shown, is transmitted to a first stub 101. As shown in FIG. 1B, a first element SIG11 of the first signal SIG1 is transmitted to a first dual inline memory module (DIMM) 111 and a second element SIG13 of the first signal SIG1 is transmitted to a second DIMM 113. The rest of the first signal SIG1 is re-transmitted to the memory controller as a first reflected wave REF1 caused by the impedance mismatch. Next, as shown in FIG. 1C, a part of the first element SIG11 transmitted to the first DIMM 111 is reflected and re-transmitted to the memory controller as a second reflected wave REF11. In the similar way, a part of the second element SIG13 transmitted to the second DIMM 113 is reflected and re-transmitted to the memory controller as a third reflected wave REF13. Herein, when a second signal SIG2 is transmitted from the memory controller, the second and the third reflected waves REF11 and REF13 of the first signal SIG1 interfere with the transmission of the second signal SIG2. Referring to FIG. 1D, a first element SIG21 of the second signal SIG2 is transmitted to the first DIMM 111 and a second element SIG23 of the second signal SIG2 is transmitted to the second DIMM 113. The rest of the second signal SIG2 is re-transmitted to the memory controller as a fourth reflected wave REF2. However, the second and the third reflected waves REF11 and REF13 of the first signal SIG1 (denoted with the reference number 131 in FIG. 1D) interfere with the transmission of the second signal SIG2 and the ISI, accordingly, occurs. For this reason, the data transmission cannot be performed reliably for the memory systems employing the SSTL. Therefore, the conventional SSTL may not be applicable for next generation memory systems which are expected for large bandwidth requirement, e.g., 3.2 Gbps or 6.4 Gbps.

In order to solve the abovementioned problems, a fully buffered DIMM (FB-DIMM) technique is introduced. The FB-DIMM defined by Joint Electron Device Engineering Council (JEDEC) is the memory module embedded with a special memory controller referred to an advanced memory buffer (AMB). The FB-DIMM technique employs a point-to-point signaling method of a daisy chain memory structure to solve the problems induced by the reflected waves of the SSTL. The FB-DIMM technique includes the AMB between the memory controller and the memory module. Therefore, the data transmission between the memory controller and the memory module is performed via the AMB. The FB-DIMM technique has a serial interface between the AMB and the memory controller. The AMB compensates for signal deterioration by buffering and resending the signal. In addition, the AMB also offers an error correction, without posing any overhead on the processor or the memory controller. By using the serial interface, it is possible for the FB-DIMM technique to solve the problems caused by the reflected waves. However, the FB-DIMM technique introduces the latency to the memory request and requires additional power consumption for the buffering operation.

Another memory system referred to as an extreme data rate (XDR) memory system is introduced by Rambus Inc. The XDR memory system employs a dynamic point-to-point (DPP) signaling method to maintain the signal integrity and solve the problems caused by the serial interface.

FIGS. 2A and 2B are block diagrams illustrating an operation of the XDR memory system.

A basic XDR memory system shown in FIG. 2A includes a memory controller 501, e.g., an application-specific integrated circuit (ASIC), a 32-bit DIMM 503, and a continuity module 505. The continuity module 505 provides an electric connection for DPP signaling method. In case the XDR memory system transmits 4-bit data, the 32-bit DIMM 503 directly transmits 2-bit data to the memory controller 501 and transmits rest 2-bit data to the memory controller 501 via the continuity module 505. Meanwhile, the continuity module 505 can be replaced with a 32 bit DIMM 507 as shown in FIG. 2B. In this case, each of the 32-bit DIMMs 503 and 507 directly transmits 2-bit data to the memory controller 501 when the XDR memory system transmits 4-bit data. As mentioned above, the XDR memory system employs the DPP signaling method to maintain the signal integrity and solve the problems caused by the serial interface. However, the bandwidth of each memory module of the XDR memory system using the DPP signaling method is decreased as the number of the module increases.

A method to solve the above problem has been suggested before: for example, J. Dally and J. W. Poulton "Digital Systems Engineering", p. 106~109, Cambridge Univ. Press, Jun. 28, 1998.

FIG. 3 is a schematic diagram describing the suggested method, which removes the reflect wave from the entire channel by connecting resistor network to the stub of the multi-drop channel.

Referring to FIG. 3, the suggested method matches the impedance of every transmission line coupled to each of stubs. By matching impedance of every transmission line, the reflected wave may not occur regardless of which one of transmission lines is selected to transmit the signal. Accordingly, the suggested method improves the signal integrity. However, the voltage amount provided to each memory module is different according to the location of each memory module in the suggested method. For the write operation, the memory module furthest from the memory controller receives the smallest amount of voltage. For the read operation, the data transmitted from the furthest memory module has the smallest voltage level. In order to compensate the voltage difference and provide equivalent amount of voltage to each memory module, the circuitry for each memory module is required to be designed differently from one another. For this reason, it is difficult to apply the suggested method to the memory interface channel.

SUMMARY OF THE INVENTION

Embodiments of the present invention are directed to a bi-directional multi-drop bus system which is capable to eliminate the reflected wave causing the ISI, and a memory module and a memory system using the bi-directional multi-drop bus system.

In accordance with an aspect of the present invention, there is provided a bus system including a plurality of connectors, each of which is serially coupled to a corresponding one of the stubs; a plurality of first serial loads, each of which is serially coupled to a corresponding one of the connectors; and a plurality of second serial loads, each of which is serially coupled to characteristic impedance of a transmission line of a corresponding one of the stubs. The first and second serial loads are determined by the following equation:

$$Zc[n]=nZ0$$

$$Zb[n]=Z0/n, Zb[0]=0$$

where, $Zc[n]$ denotes the first serial loads; the $Zb[n]$ denotes the second serial loads; n denotes an index allocated for each of the stubs and has '0' or a positive integer; and Z0 denotes a characteristic impedance of the bus system.

In accordance with another aspect of the present invention, there is provided a bus system including a plurality of stubs; a plurality of connectors, each of which is serially coupled between a corresponding one of the stubs and a corresponding one of memory modules; a plurality of first serial loads, each of which is serially coupled to a corresponding one of the connectors; a plurality of second serial loads, each of which is serially coupled to characteristic impedance of a transmission line of a corresponding one of the stubs; and a parallel resistor of $$\frac{Z1Z2}{Z2-Z1}$$

connected to a final one of the stubs. The first and second serial loads are determined by the following equation:

$$Zc[n] = nZ1, Zc[0] = 0$$

$$Zb[n] = \frac{Z1^2}{(n+1)Z1 + Z2}$$

where, $Zc[n]$ denotes the first serial loads; the $Zb[n]$ denotes the second serial loads; n denotes an index allocated for each of the stubs and has a positive integer; Z1 denotes a characteristic impedance of the bus system; and Z2 denotes a characteristic impedance of the memory module.

In accordance with still another aspect of the present invention, there is provided a bus system including a plurality of stubs; a plurality of connectors, each of which is serially coupled between a corresponding one of the stubs and a corresponding one of memory modules; a plurality of first serial loads, each of which is serially coupled to a corresponding one of the connectors; and a plurality of second serial loads, each of which is serially coupled to characteristic impedance of a transmission line of a corresponding one of the stubs. The first and second serial loads are determined by the following equation:

$$Zc[n] = (n+1)Z1 - Z2$$

$$Zb[n] = \frac{Z1}{n}$$

where, $Zc[n]$ denotes the first serial loads; the $Zb[n]$ denotes the second serial loads; n denotes an index allocated for each of the stubs and has '0' or a positive integer; Z1 denotes a characteristic impedance of the bus system; and Z2 denotes a characteristic impedance of the memory module.

In accordance with a further aspect of the present invention, there is provided a bus system including a plurality of stubs; a plurality of connectors, each of which is serially coupled between a corresponding one of the stubs and a corresponding one of memory modules; a plurality of first serial loads, each of which is serially coupled to a corresponding one of the connectors; and a plurality of second serial loads, each of which is serially coupled to characteristic impedance of a transmission line of a corresponding one of the stubs. The first and the second serial loads are determined to be impedance matched at each transmission line terminal of the stubs.

In accordance with a further aspect of the present invention, there is provided a memory system including a plurality of stubs; a plurality of connectors, each of which is serially coupled between a corresponding one of the stubs and a corresponding one of memory modules; a plurality of first serial loads, each of which is serially coupled to a corresponding one of the connectors; and a plurality of second serial loads, each of which is serially coupled to characteristic impedance of a transmission line of a corresponding one of the stubs. The first and second serial loads are determined by the following equation:

$$Zc[n]=nZ0$$

$$Zb[n]=Z0/n, Zb[0]=0$$

where, $Zc[n]$ denotes the first serial loads; the $Zb[n]$ denotes the second serial loads; n denotes an index allocated for each of the stubs and has '0' or a positive integer; and Z0 denotes the characteristic impedance of the transmission line.

In accordance with a further aspect of the present invention, there is provided a memory system including a plurality of stubs; a plurality of connectors, each of which is serially coupled between a corresponding one of the stubs and a corresponding one of memory modules; a plurality of first serial loads, each of which is serially coupled to a corresponding one of the connectors; a plurality of second serial loads, each of which is serially coupled to characteristic impedance of a transmission line of a corresponding one of the stubs; and a parallel resistor of $$\frac{Z1Z2}{Z2 - Z1}$$

connected to the final stub. The first and second serial loads are determined by the following equation:

$$Zc[n] = nZ1, Zc[0] = 0$$
$$Zb[n] = \frac{Z1^2}{(n+1)Z1 + Z2}$$

where, Zc[n] denotes the first serial loads; the Zb[n] denotes the second serial loads; n denotes an index allocated for each of the stubs and has a positive integer; Z1 denotes the characteristic impedance of the transmission line; and Z2 denotes a characteristic impedance of the memory module.

In accordance with a further aspect of the present invention, there is provided a memory system including a plurality of stubs; a plurality of connectors, each of which is serially coupled between a corresponding one of the stubs and a corresponding one of memory modules; a plurality of first serial loads, each of which is serially coupled to a corresponding one of the connectors; and a plurality of second serial loads, each of which is serially coupled to characteristic impedance of a transmission line of a corresponding one of the stubs. The first and second serial loads are determined by the following equation:

$$Zc[n] = (n+1)Z1 - Z2$$
$$Zb[n] = \frac{Z1}{n}$$

where, Zc[n] denotes the first serial loads; the Zb[n] denotes the second serial loads; n denotes an index allocated for each of the stubs and has '0' or a positive integer; Z1 denotes the characteristic impedance of the transmission line; and Z2 denotes a characteristic impedance of the memory module.

In accordance with a further aspect of the present invention, there is provided a memory system including a plurality of stubs; a plurality of connectors, each of which is serially coupled between a corresponding one of the stubs and a corresponding one of memory modules; a plurality of first serial loads, each of which is serially coupled to a corresponding one of the connectors; and a plurality of second serial loads, each of which is serially coupled to characteristic impedance of a transmission line of a corresponding one of the stubs. The first and the second serial loads are determined to be impedance matched at each transmission line terminal of the stubs.

In accordance with a further aspect of the present invention, there is provided a memory module including a first load, coupled to a bus connector; a second load, coupled to the first load, having an equivalent impedance with the first load; a first memory chip coupled to the second load; a third load, coupled in parallel with the second load, having the equivalent impedance with the first load; a second memory chip coupled to the third load; and a fourth load, serially coupled between the first load and a common node of the second and third loads, having a half impedance of the first load.

DESCRIPTION OF SPECIFIC EMBODIMENTS

Other objects and advantages of the present invention can be understood by the following description, and become apparent with reference to the embodiments of the present invention.

Figure 1A:
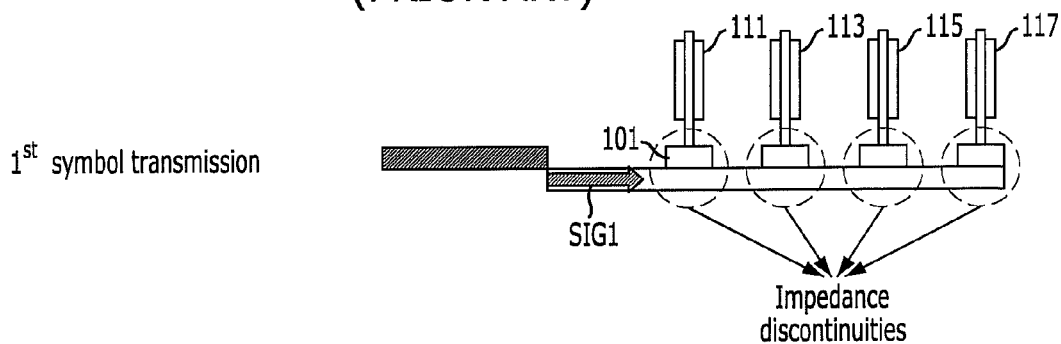
FIGS. 1A to 1D show diagrams for explaining the concept of the SSTL employed by the conventional memory systems having a multi-drop bus system.
Figure 1B:
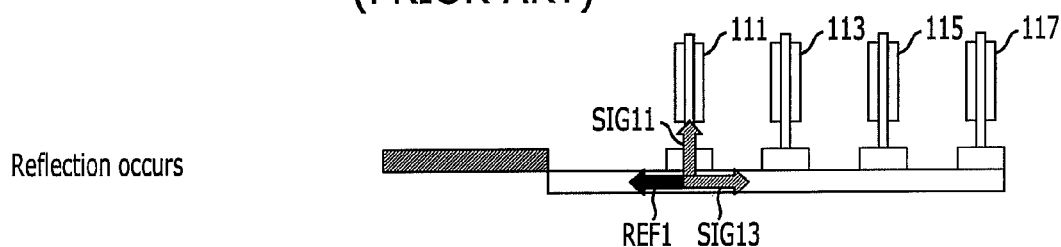
Figure 1C:
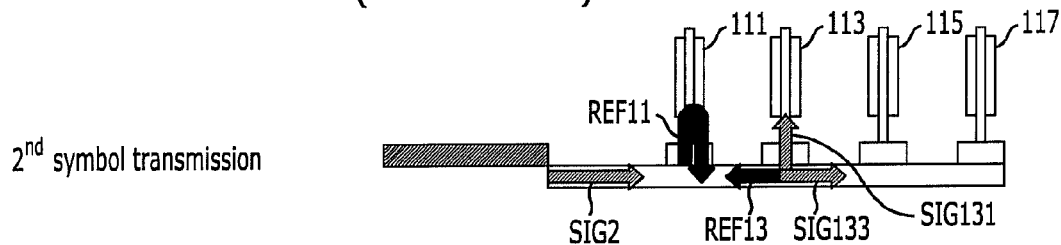
Figure 1D:
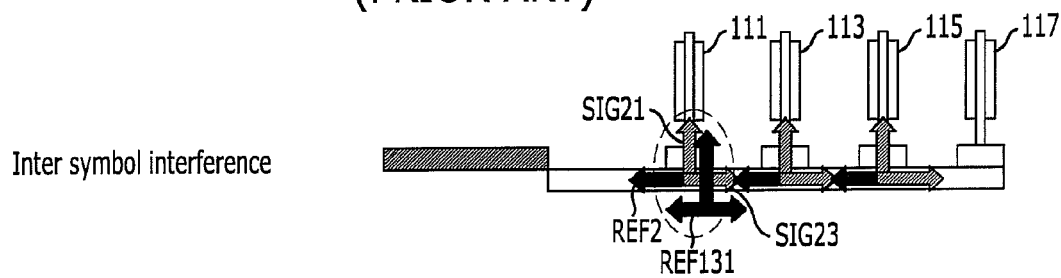
Figure 2A:
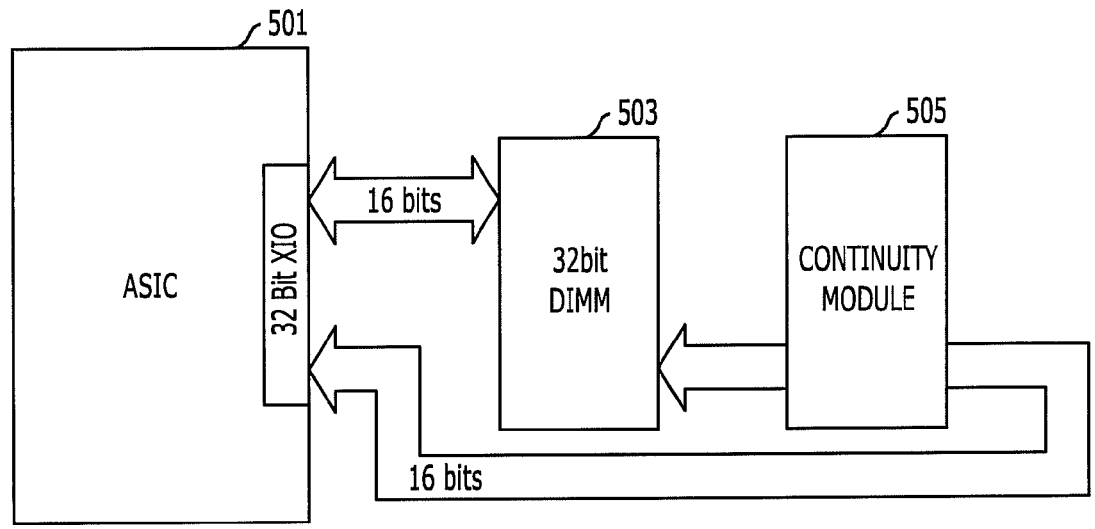
FIGS. 2A and 2B show block diagrams illustrating an operation of the XDR memory system.
Figure 2B:
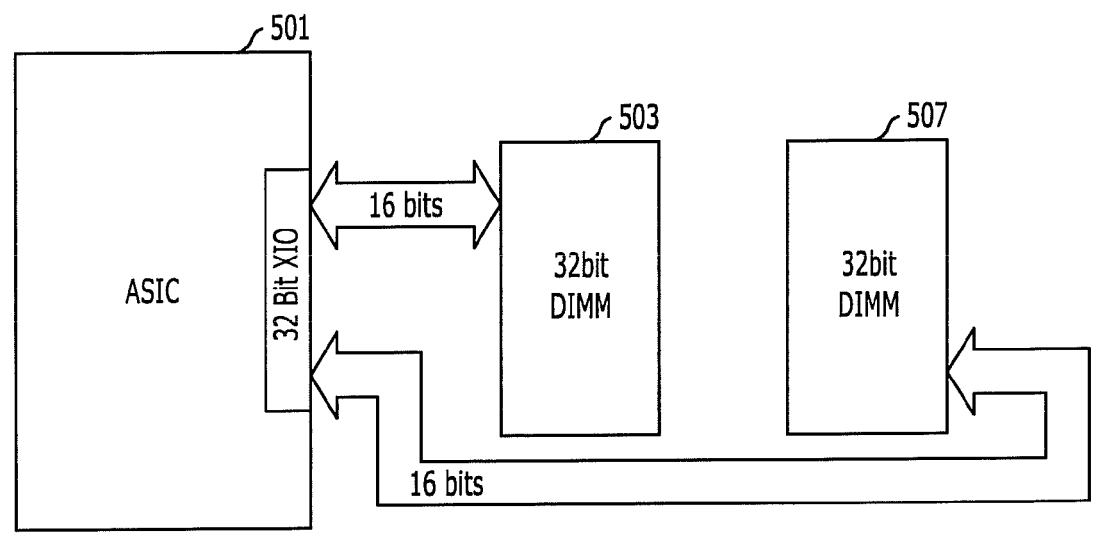
Figure 3:
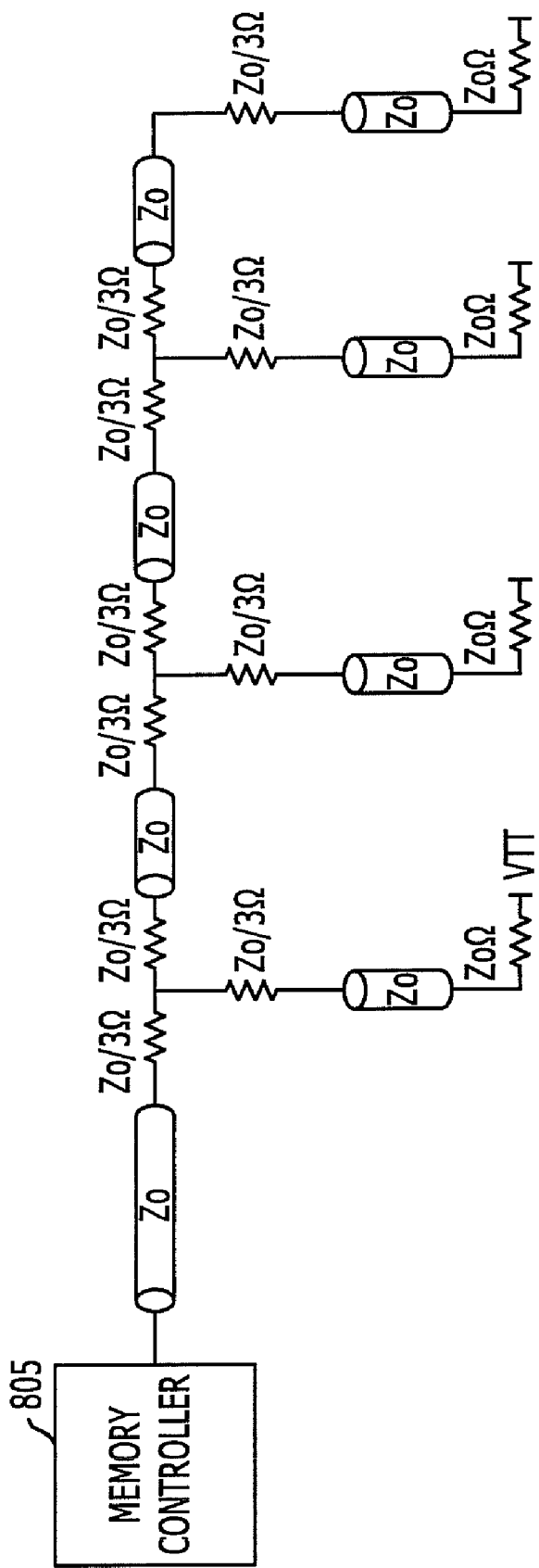
FIG. 3 shows schematic diagram describing the conventional method removing the reflect wave from the entire channel by connecting resistor network to the stub of the multi-drop channel.
Figure 4:
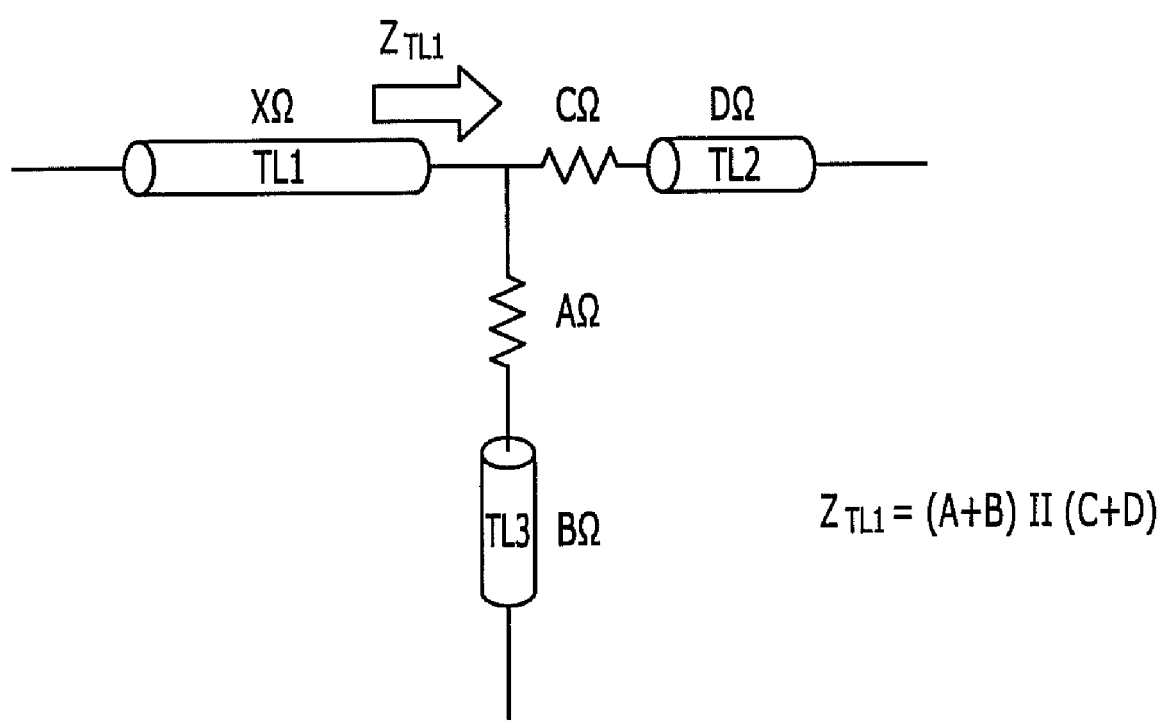
FIG. 4 shows a schematic diagram describing an equivalent load of a transmission line.

FIG. 4 is a schematic diagram describing an equivalent load of a transmission line.

The equivalent load $Z_{TL1}$ loaded at a first terminal of a first transmission line TL1 is constituted with resistor loads AΩ and CΩ, which are physical elements, whose second terminals are coupled to the second terminal of the first transmission line TL1, and characteristic impedances DΩ and BΩ of second and third transmission lines TL2 and TL3 whose second terminals are coupled to first terminals of the resistor loads AΩ and CΩ. Because first terminals of the second and third transmission lines TL2 and TL3 are not seen at the first terminal of the first transmission line TL1, the equivalent load $Z_{TL1}$ loaded at the first terminal of the first transmission line TL1 becomes (A+B)||(C+D).

Figure 5:
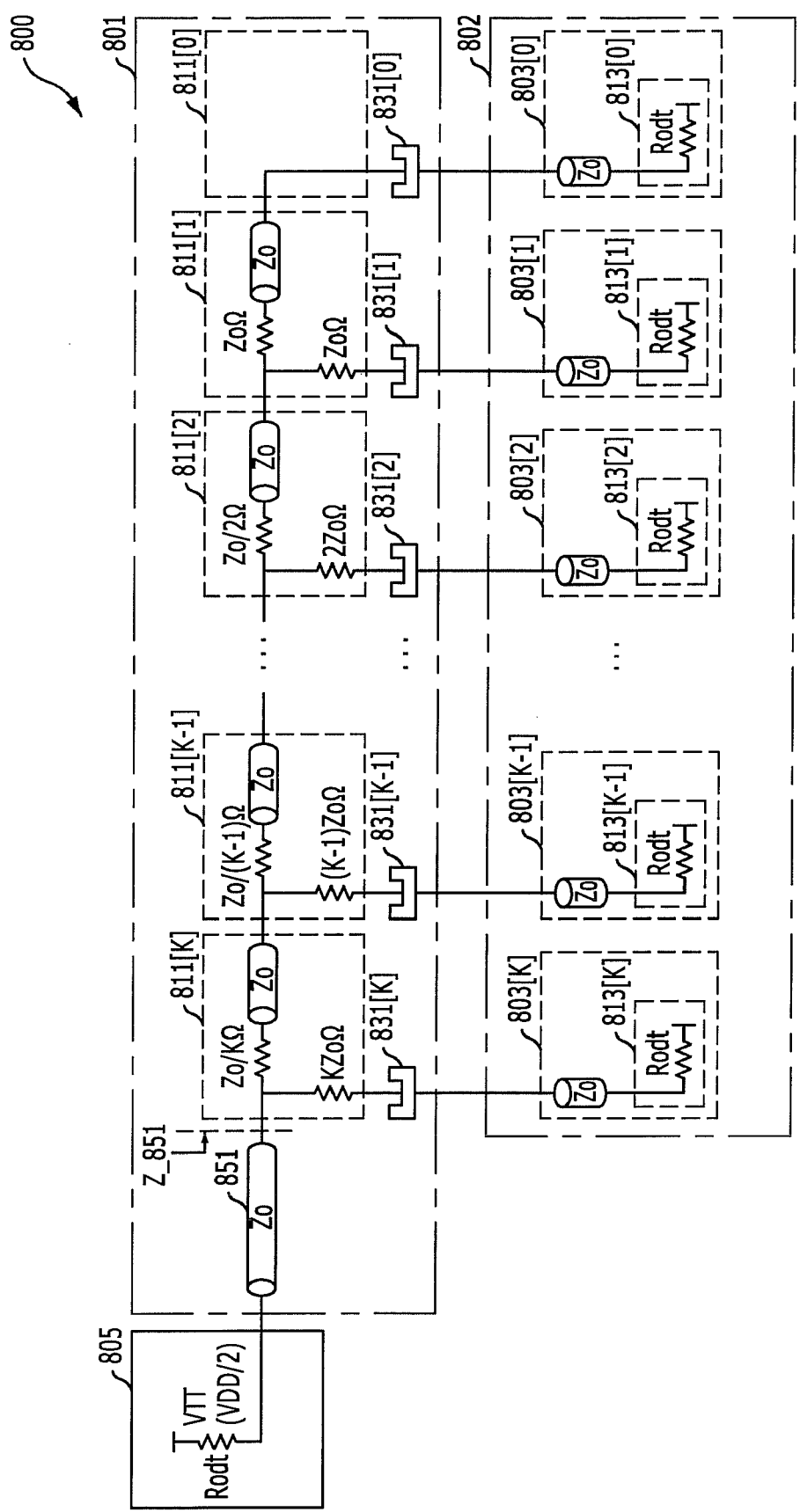
FIG. 5 shows a schematic diagram representing a bi-directional multi-drop bus system in accordance with an embodiment of the present invention, and a memory module and a memory system using the bi-directional multi-drop bus system.

FIG. 5 is a schematic diagram representing a bi-directional multi-drop bus system in accordance with an embodiment of the present invention, and a memory module and a memory system using the bi-directional multi-drop bus system.

As shown in FIG. 5, the memory system 800 includes a bi-directional multi-drop bus system 801, a memory module unit 802, and a memory controller 805. The bi-directional multi-drop bus system 801 is constituted with K+1 numbers of stubs 811[0:K] and K+1 numbers of connectors 831[0:K], each of which is coupled to a corresponding one of the stubs 811[0:K]. Second terminal of the (K+1)th stub 811[K] is coupled to the memory controller 805 through a transmission line 851. The memory module unit 802 includes K+1 numbers of memory modules 803[0:K], each of which is coupled to a corresponding one of the connectors 831[0:K]. Each of the memory modules 803[0:K] includes a single memory chip, a corresponding one out of memory chips 813[0:K]. The memory controller 805 and the memory chips 813[0:K] are terminated as an on-die termination (ODT) load Rodt.

Herein, the memory chips 813[0:K] perform as a read driver; and the memory controller 805 performs as a write driver. It is presumed that theses read and write drivers are line-matched. For example, the memory controller 805 is line-matched with characteristic impedance of the bi-directional multi-drop bus system 801; and the memory chips 813[0:K] are line-matched with characteristic impedances of the memory modules 803[0:K].

For illustration purposes, the memory controller 805 is simply depicted with the ODT load Rodt; and the memory chips 813[0:K] are simply depicted with character impedance of printed circuit board (PCB) trace in the drawings. Memory modules, connectors, and stubs closest from the memory controller 805 are indexed to K; and those farthest from the memory controller 805 are indexed to 0 in every applicable figures of this application.

As shown in FIG. 5, the characteristic impedances and ODT loads of the bi-directional multi-drop bus system 801 are equivalent to Z0. Further, the characteristic impedances of the memory modules 803[0:K] are also Z0. The unit of loads and the characteristic impedances are [Ω] as long as it is not specifically mentioned.

In the embodiment of the present invention shown in FIG. 5, each of the stubs 811[0:K] includes first load Zc[n] serially connected to the corresponding one of the connectors 831[0:K+1] and second load Zb[n] serially connected to the characteristic impedance of a bus transmission line. The stub 811[0] does not includes the first and second loads zc[0] and Zb[0]. The first and second loads Zc[n] and Zb[n] are expressed by equation 1:

$$Zc[n] = nZ0$$

$$Zb[n] = \frac{Z0}{n}$$

Equation 1 where, Z0 is the characteristic impedance of the bi-directional multi-drop bus system 801; 'n (0≦n≦K, 'n' is a positive integer)' is the index of the connectors 831[0:K].

By considering the first and the second loads Zc[n] and Zb[n], the equivalent load which is loaded at the second terminal of each stub is the characteristic impedance Z0 of the bi-directional multi-drop bus system 801 and, further, the uniform voltage level is supplied to each of the memory modules 803[0:K]. For example, the equivalent impedance Z_851 loaded at the second terminal of the (K+1)th stub 811[K] becomes Z0 induced by equation 2:

$$Z\_851 = \left(\frac{Z0}{K} + Z0\right) \| (KZ0 + Z0)$$

$$= \frac{\left(\frac{Z0}{K} + Z0\right) * (KZ0 + Z0)}{\left(\frac{Z0}{K} + Z0\right) + (KZ0 + Z0)}$$

$$= Z0$$

Equation 2

Figure 6:
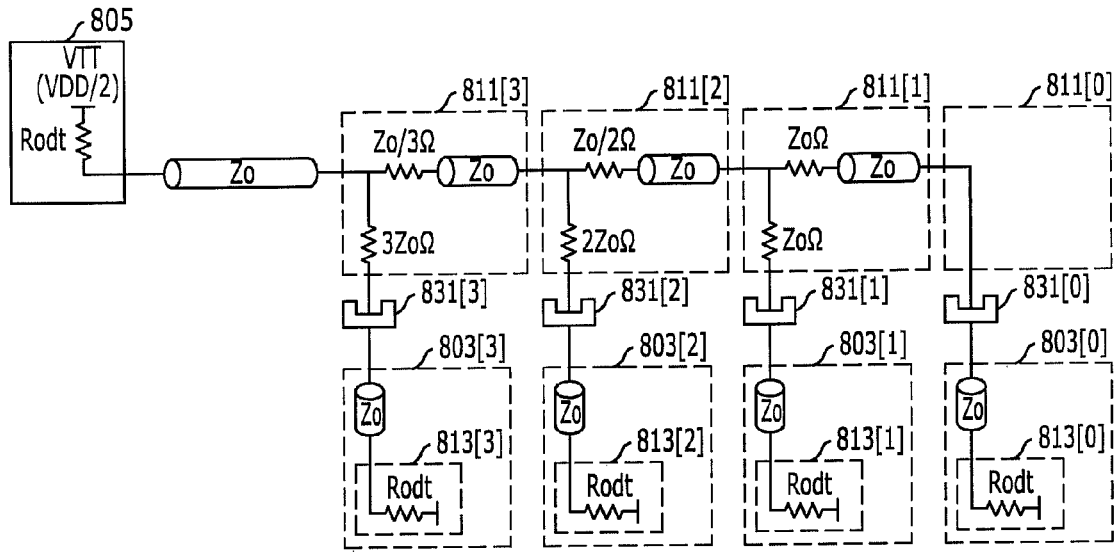
FIG. 6 shows a schematic diagram representing the bi-directional multi-drop bus system in accordance with an embodiment of the present invention, and the memory module and the memory system using the bi-directional multi-drop bus system including four stubs.

FIG. 6 is a schematic diagram representing the bi-directional multi-drop bus system in accordance with an embodiment of the present invention, and the memory module and the memory system using the bi-directional multi-drop bus system including four stubs. For convenience, like reference numerals are used to refer to like elements throughout the drawings.

As shown in FIG. 6, the first loads Zc[1:3] of the stubs 811[1:3] becomes Z0, 2Z0, 3Z0, respectively; and the second loads Zb[1:3] of the stubs 811[1:3] becomes Z0, Z0/2, Z0/3, respectively, according to the [EQUATION 1].

Accordingly, the equivalent load which is loaded at the second terminal of each stub becomes the characteristic impedance Z0 of the bi-directional multi-drop bus system 801. This means the impedance mismatch in each of the stubs is eliminated. Thus, the signal integrity is improved by eliminating the reflected wave. The first and the second loads Zc[n] and Zb[n] can be implemented with a PCB embedded load integrated to a PCB or a surface mount technology (SMT) resistance.

Figure 7A:
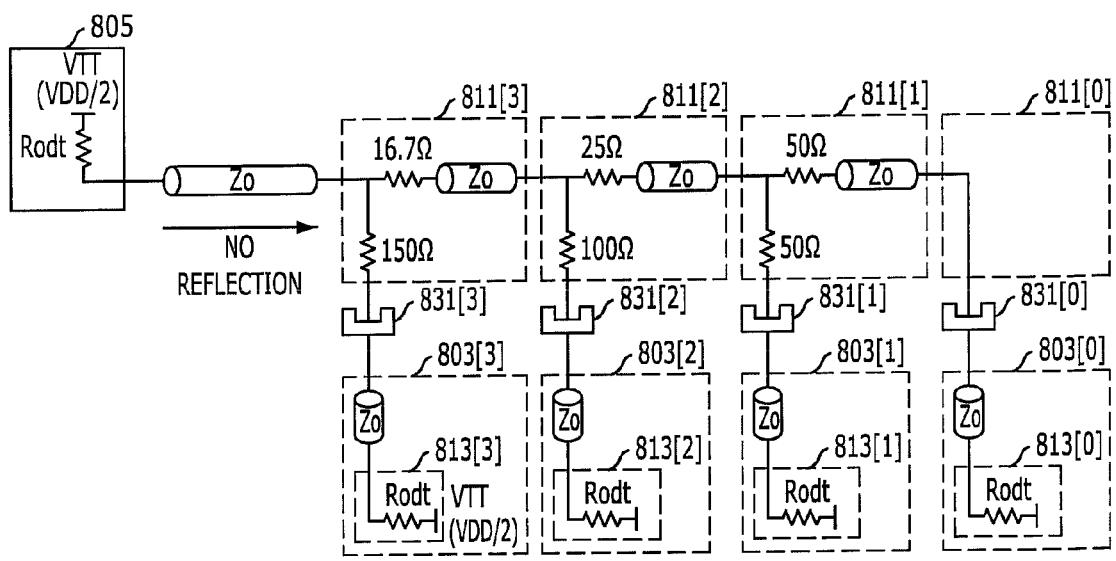
FIGS. 7A to 7C show schematic diagrams representing a write operation of the bi-directional multi-drop bus system, and the memory module and the memory system using the bi-directional multi-drop bus system shown in FIG. 6.
Figure 7B:
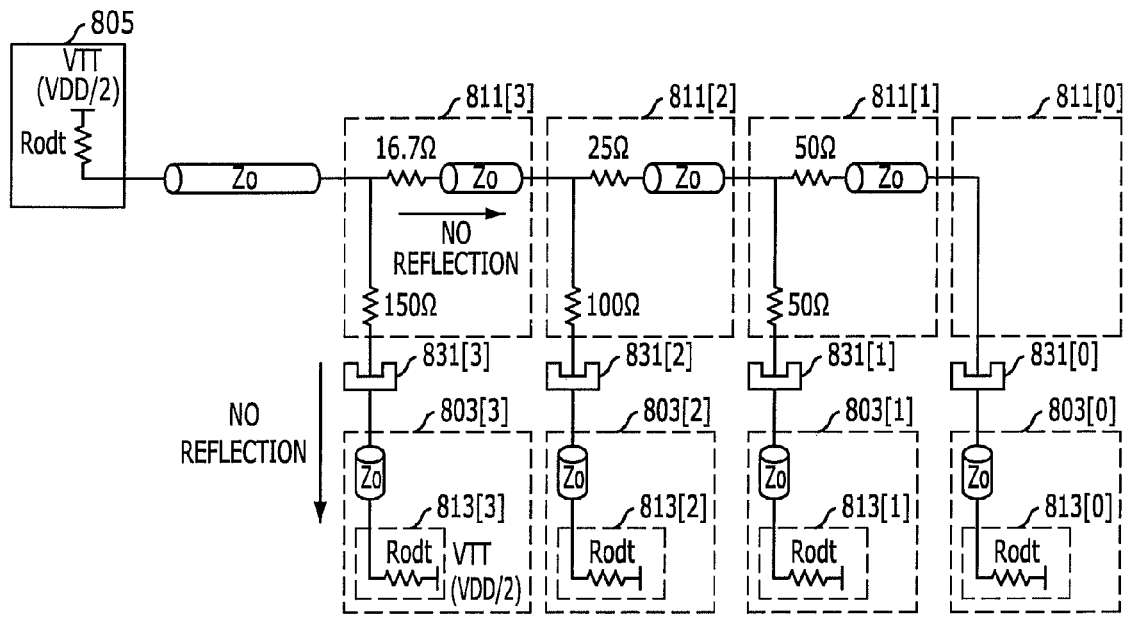
Figure 7C:
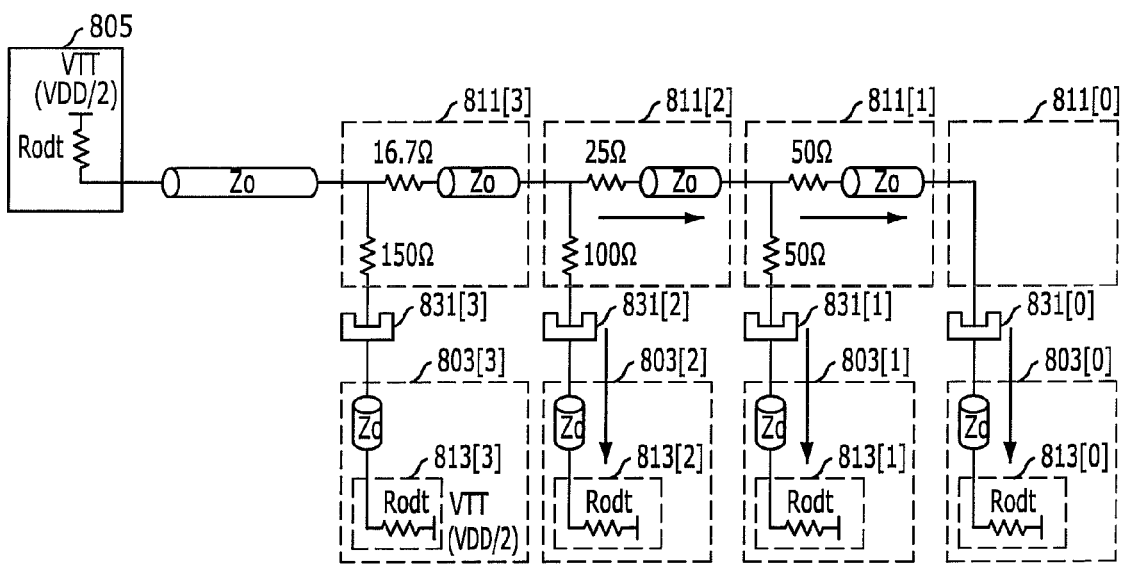

FIGS. 7A to 7C are schematic diagrams representing a write operation of the bi-directional multi-drop bus system, and the memory module and the memory system using the bi-directional multi-drop bus system shown in FIG. 6. For convenience, like reference numerals are used to refer to like elements throughout the drawings.

The embodiment in FIGS. 7A to 7C depicts the case where the characteristic impedance Z0 of the bi-directional multi-drop bus system 801 is 50 (that is, 50Ω). Thus, the first loads Zc[1:3] of the stubs 811[1:3] becomes 50, 100, and 150Ω, respectively; and the second loads Zb[1:3] of the stubs 811 [1:3] becomes 50, 25, and 16.7Ω, respectively, according to the [EQUATION 1].

Referring to FIG. 7A, the signal outputted from the memory controller 805 are separately transmitted to the memory module 803[3] and the bus transmission line at the stub 811[3] without the reflected wave. Referring to FIG. 7B, the signal transmitted to the memory module 803[3] is removed by the ODT load without the reflected wave. The signal transmitted to the bus transmission line is separately transmitted to the memory module 803[2] and the bus transmission line at the stub 811[2] without the reflected wave. The signal transmitted to the memory module 803[2] is removed by the ODT load without the reflected wave. By abovementioned way, the signal is transmitted to the memory modules 803[1:0] subsequently without reflected wave as shown in FIG. 7C. As described above, the signal is transmitted from the memory controller 805 to the memory modules 803[0:3] without the reflected wave for the write operation and, therefore, the bi-directional multi-drop bus system 801 in accordance with the present invention may improve the signal integrity.

Figure 8A:
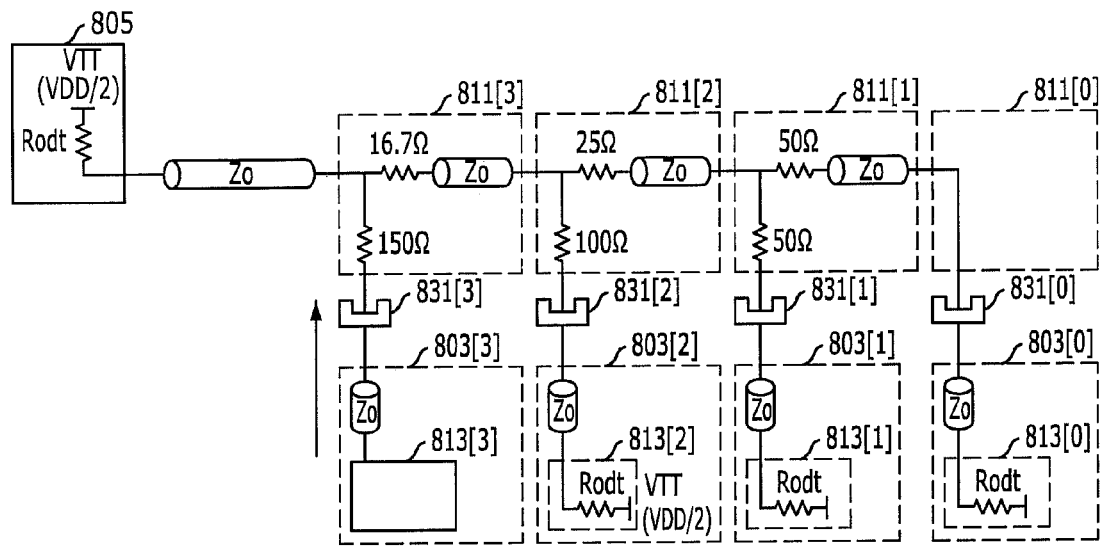
FIGS. 8A to 9C show schematic diagrams representing a read operation of the bi-directional multi-drop bus system, and the memory module and the memory system using the bi-directional multi-drop bus system shown in FIG. 6.
Figure 8B:
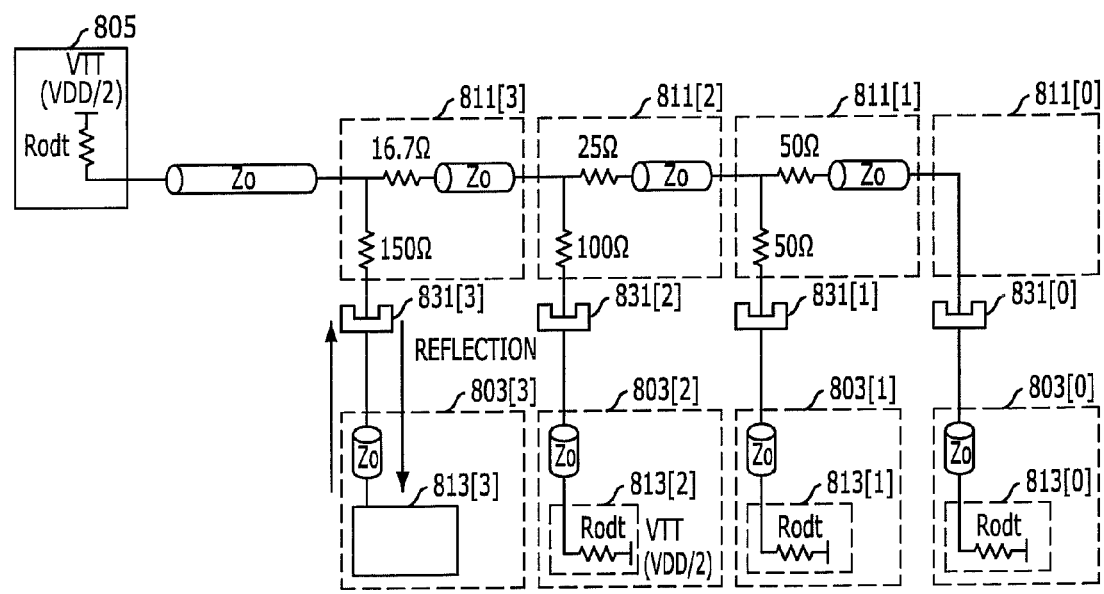
Figure 8C:
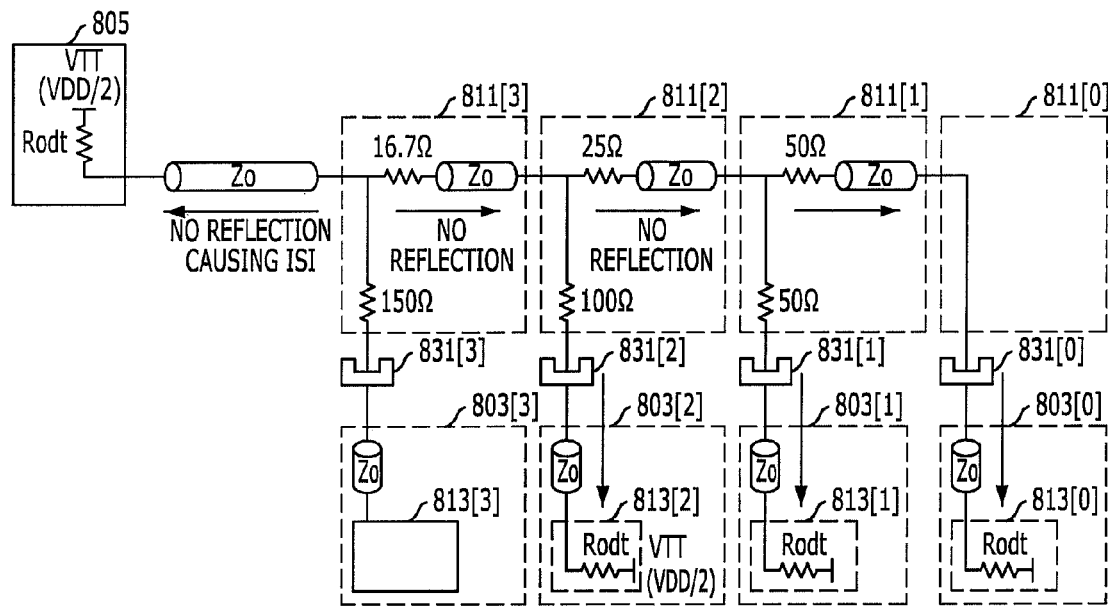

FIGS. 8A to 8C are schematic diagrams representing a read operation of the bi-directional multi-drop bus system, and the memory module and the memory system using the bi-directional multi-drop bus system shown in FIG. 6. In this case, the read operation is performed for the data stored in the memory module 803[3]; and the characteristic impedance Z0 of the bi-directional multi-drop bus system 801 is 50Ω. For convenience, like reference numerals are used to refer to like elements throughout the drawings.

Referring to FIG. 8A, when the read operation is performed for the data stored in the memory module 803[3], the data stored in the memory chip 813[3] is transmitted to the stub 811[3]. Referring to FIG. 8B, the reflected wave occurs to the data transmitted from the memory chip 813[3] because of the impedance mismatch at the connector 831[3] and, thus, a partial portion of the data is re-transmitted to the memory chip 813[3]. The partial portion of the data re-transmitted to the memory chip 813[3] is removed by the ODT load of the memory chip 813[3]. The rest of the data is transmitted to the stub 811[2] through the stub 811[3] and the memory controller 805. The data transmitted to the stub 811[2] is transmitted to the stubs 811[1:0] and removed by the ODT loads in the memory chips 813[1:0] without the reflected wave as described above. The data transmitted to the memory controller 805 transmitted to a receiver, which is not depicted in the drawings, by the ODT load Rodt without the reflected wave as shown in FIG. 8C. Accordingly, the data is transmitted from the memory module 803[3] to the memory controller 805 without the reflected wave for the read operation and, therefore, the bi-directional multi-drop bus system 801 in accordance with the present invention improves the signal integrity.

Figure 9A:
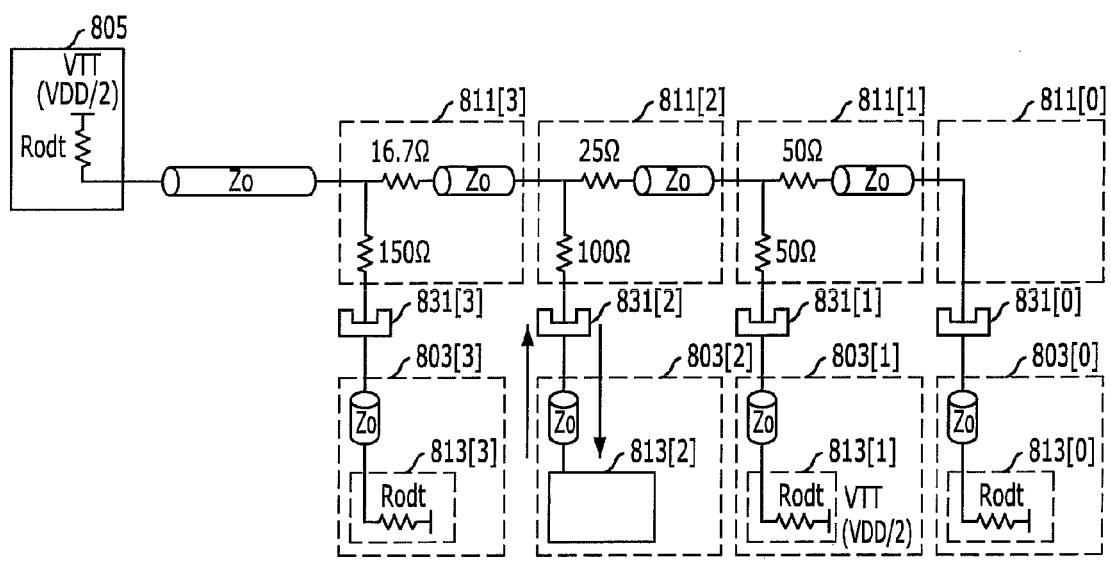
Figure 9B:
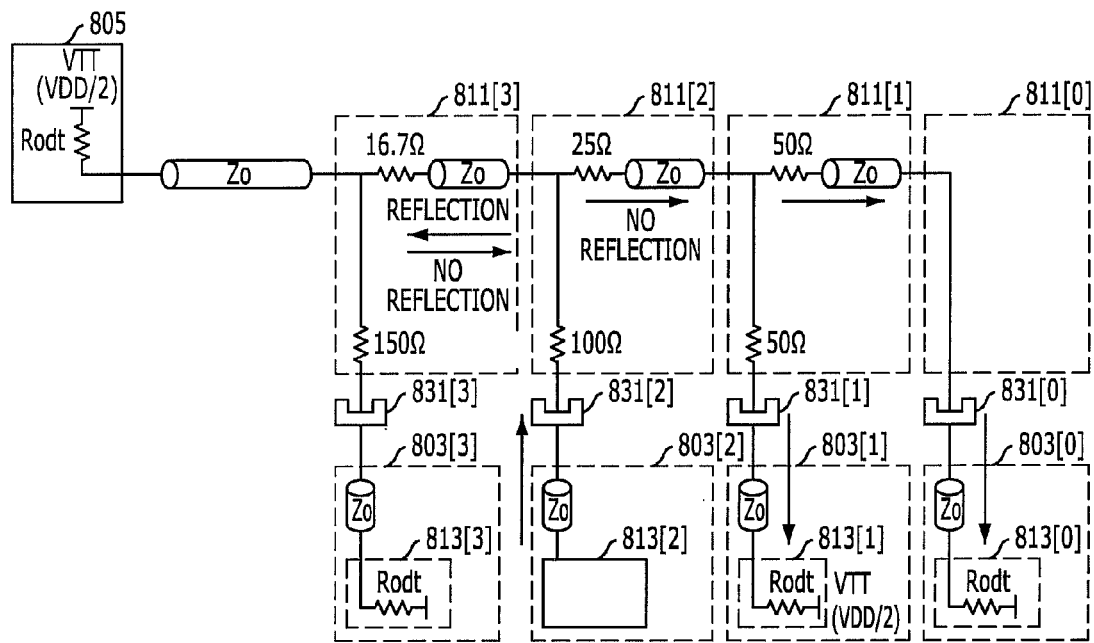
Figure 9C:
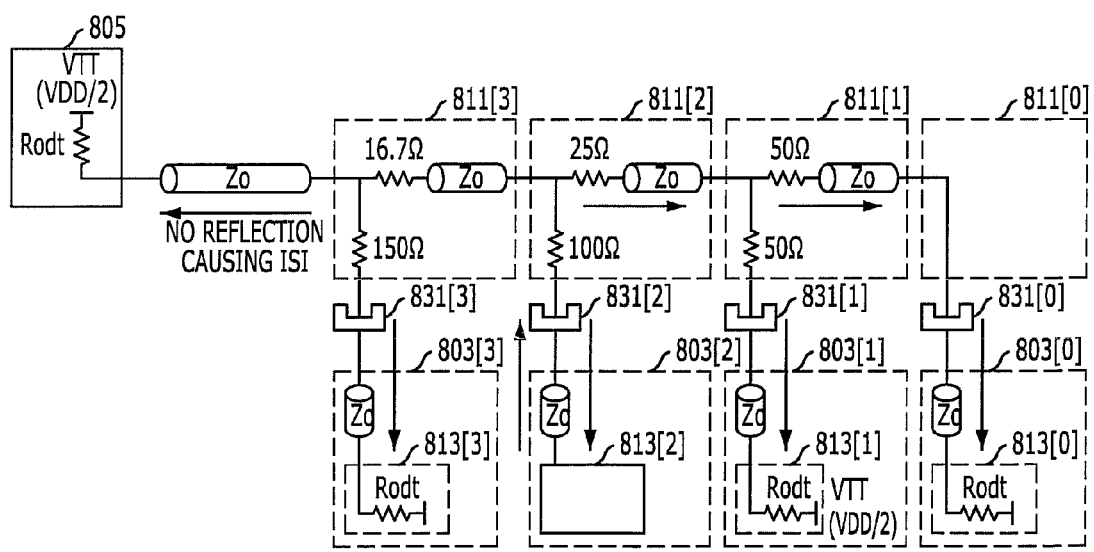

FIGS. 9A to 9C are schematic diagrams representing the read operation of the bi-directional multi-drop bus system, and the memory module and the memory system using the bi-directional multi-drop bus system shown in FIG. 6. In this case, the read operation is performed for the data stored in the memory module 803[2]; and the characteristic impedance Z0 of the bi-directional multi-drop bus system 801 is 50. For convenience, like reference numerals are used to refer to like elements throughout the drawings.

Referring to FIG. 9A, when the read operation is performed for the data stored in the memory module 803[2], the data stored in the memory chip 813[2] is transmitted to the stub 811[2]. The reflected wave occurs to the data transmitted from the memory chip 813[2] because of the impedance mismatch at the connector 831[2] and, thus, a partial portion of the data is re-transmitted to the memory chip 813[2]. The partial portion of the data re-transmitted to the memory chip 813[2] is removed by the ODT load of the memory chip 813[2].

Referring to FIG. 9B, the rest of the data is transmitted to the stubs 811[1] and 811[3]. The data transmitted to the stub 811[1] is transmitted to the memory modules 803[1:0] and, consequently, removed by the ODT loads of the memory chips 813[1:0] without the reflected wave as described above. Meanwhile, the reflected wave occurs for the data transmitted to the stub 811[3] because of the impedance mismatch at the stub 811[3].

Referring to FIG. 9C, a partial portion of the data transmitted to the stub 8113[3] is re-transmitted to the stub 811[2] as the reflected wave. The partial portion of the data re-transmitted to the stub 811[2] is transmitted to the stubs 811[1:0] and, then, to the memory modules 803[2:0] without the reflected wave and, then, removed by the ODT load of the memory chips 813[2:0]. The rest of the data is transmitted to the stub 811[3] and, then, to the memory module 803[3] and the memory controller 805. The portion of data transmitted to the memory module 803[3] is removed by the ODT load of the memory chip 813[3]. The portion of data transmitted to the memory controller 805 is transmitted to a receiver, which is not depicted in the drawings, by the ODT load Rodt without the reflected wave.

Accordingly, the data is transmitted from the memory module 803[2] to the memory controller 805 without the reflected wave for the read operation and, therefore, the bi-directional multi-drop bus system 801 in accordance with the present invention improves the signal integrity.

Further, by using the bi-directional multi-drop bus system in accordance with the embodiment of the present invention, the read operation and the write operation can be performed without the signal interference, and, thus, there is no requirement for separating the read channel and the write channel.

In abovementioned embodiment, the present invention is explained with the single rank where one memory module is attached to one slot. In another embodiment, it is also possible to apply the present invention to the dual rank which two modules are attached to one slot.

Figure 10A:
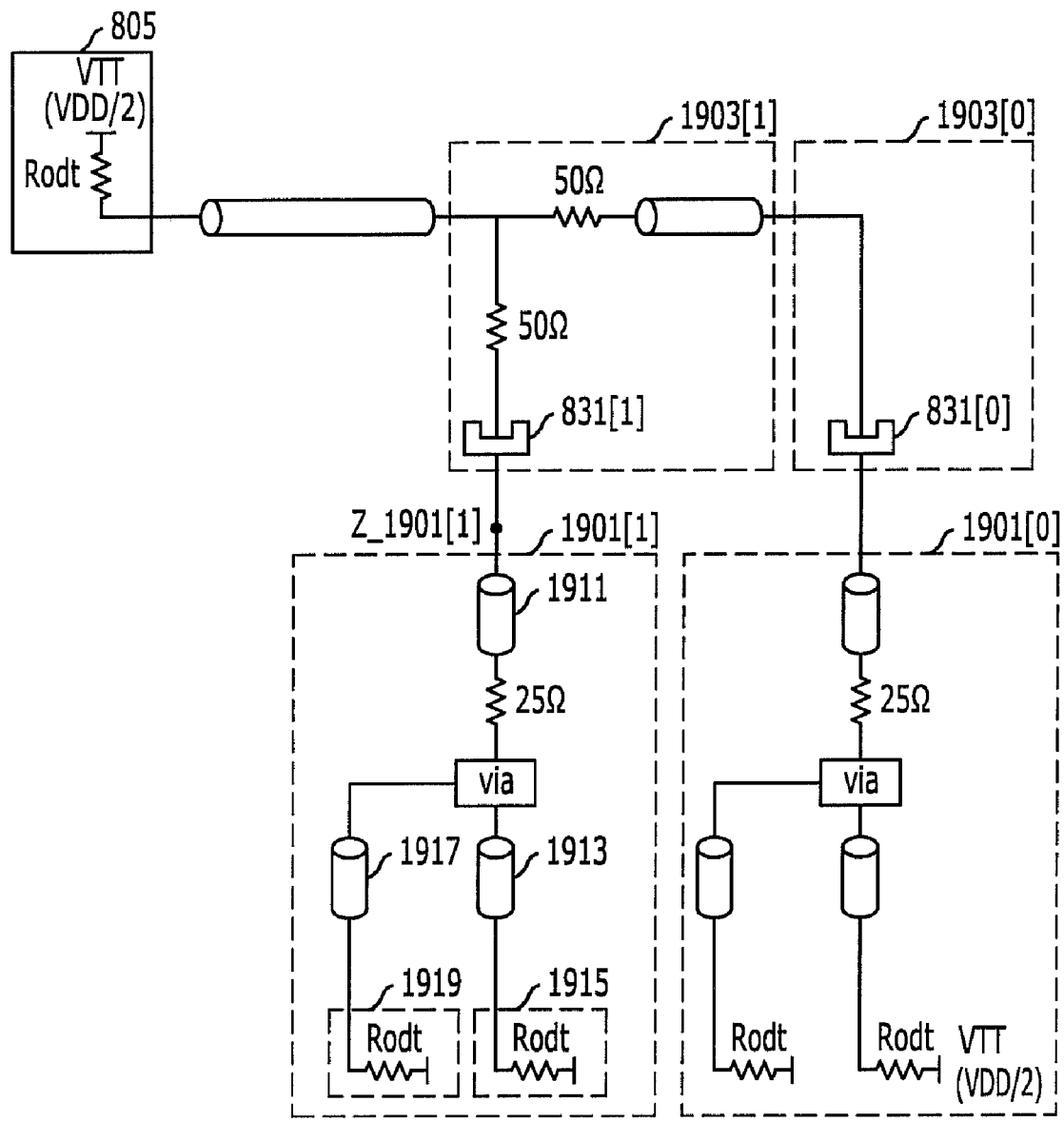
FIGS. 10A and 10B show schematic diagrams representing a bi-directional multi-drop bus system in accordance with another embodiment of the present invention, and the memory module and the memory system using the bi-directional multi-drop bus system
Figure 10B:
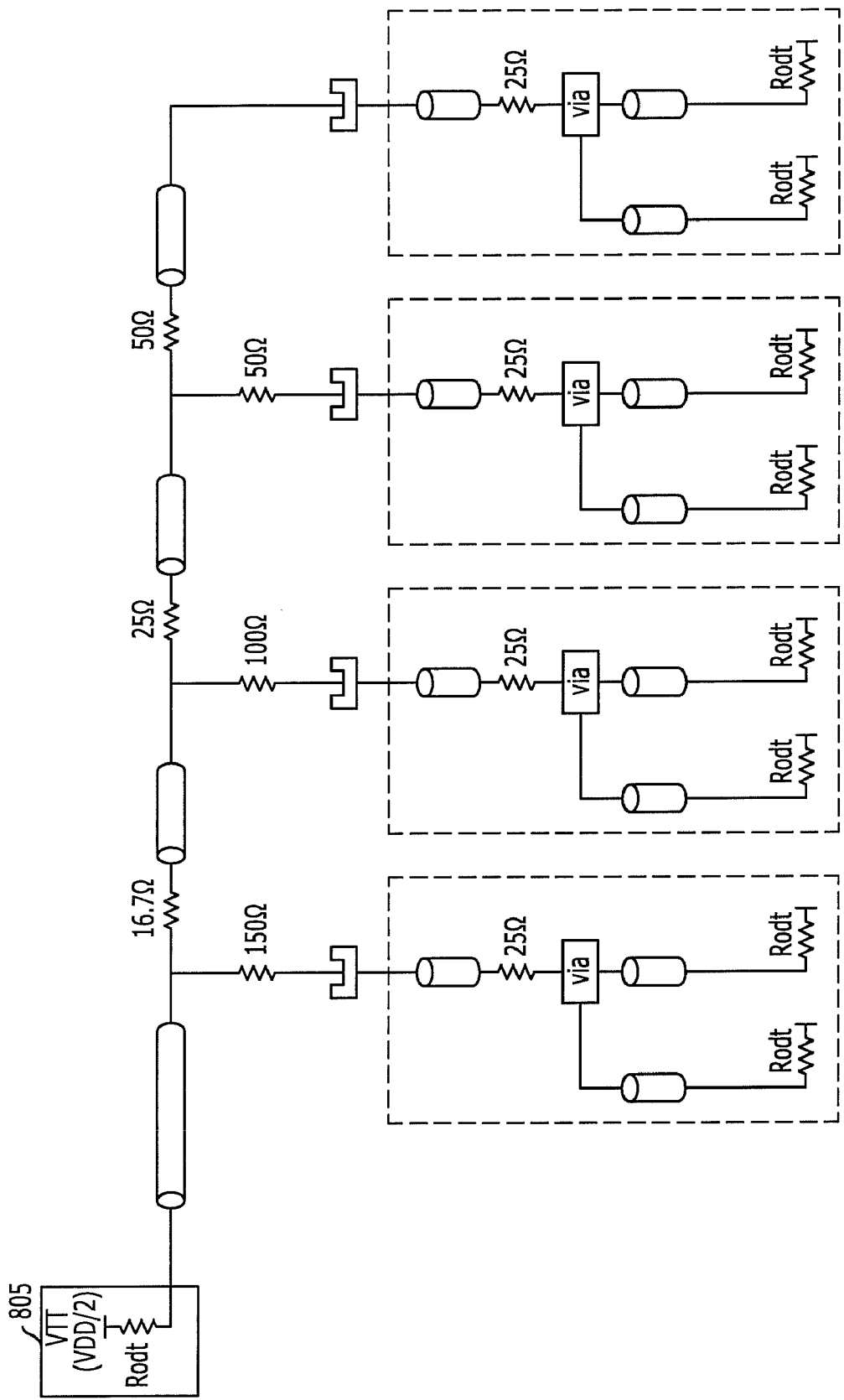

FIGS. 10A and 10B are schematic diagrams representing a bi-directional multi-drop bus system in accordance with another embodiment of the present invention, and the memory module and the memory system using the bi-directional multi-drop bus system. For convenience, like reference numerals are used to refer to like elements throughout the drawings.

In case of FIG. 10A, the memory system has the dual rank of 2 slots-4 chips structure. The memory system includes two stubs 1903[0:1] and two memory modules 1901[0:1], each of which is coupled to a corresponding one of the stubs 1903[0:1]. In case of the dual rank, the memory module 1901[1] includes two sides and a first load 1911 coupled to a connector 831[1] in the stub 1903[1]. First side of the memory module 1901[1] includes a second load 1913 coupled to the first load 1911 through a via hole VIA and a first memory chip 1915 coupled to the second load 1913. Second side of the memory module 1901[1] includes a third load 1917 coupled to the first load 1911 through the via hole VIA and a second memory chip 1919 coupled to the third load 1917. The via hole VIA penetrates a PCB between the first and the second loads 1911 and 1913. The first to third loads 1911, 1913, and 1917 are characteristic impedances of the memory module 1901[1]. The memory module 1901[0] has the equivalent structure with the memory module 1901[1].

FIG. 10B depicts the memory system having the dual rank of 4 slots-8 chips structure. The memory system includes four memory modules. Each of the modules has the equivalent structure with the memory module 1901[1] shown in FIG. 10A.

In the embodiments of the present invention shown in FIGS. 10A and 10B, the characteristic impedances of the memory modules are equivalent to the characteristic impedance Z0 of the bi-directional multi-drop bus system 801 as 50Ω. A serial load Z0/2 is included between the first load 1911 and the via hole VIA. By considering the serial load Z0/2, the equivalent load Z_1901[1] loaded at a first terminal of the first load 1911 becomes Z0.

In the above cases shown in FIGS. 5 to 10B, the characteristic impedances of the stubs and the memory modules are equivalent to each other (that is, Z0). In this case, an operational voltage Signalswing$_{write\&read}$ for the read and write operations becomes the value induced by equation 3:

$$Signalswing_{write\&read} = V_H - V_L \quad \text{Equation 3}$$

$$= \frac{1}{2(K+1)}\{V_{TT} + (V_{DD} - V_{TT}) -$$

$$V_{TT} + (V_{TT} - V_{SS})\}$$

$$= \frac{1}{2(K+1)}(V_{DD} - V_{SS})$$

In other words, the operational voltages Signalswing$_{write\&read}$ for the read and write operations have the equivalent value to each other expressed by the [EQUATION 3] regardless of the arrangement of the memory modules.

Meanwhile, the present invention also can be applied to the embodiments that the stubs and the memory modules have the different characteristic impedances each other.

Figure 11:
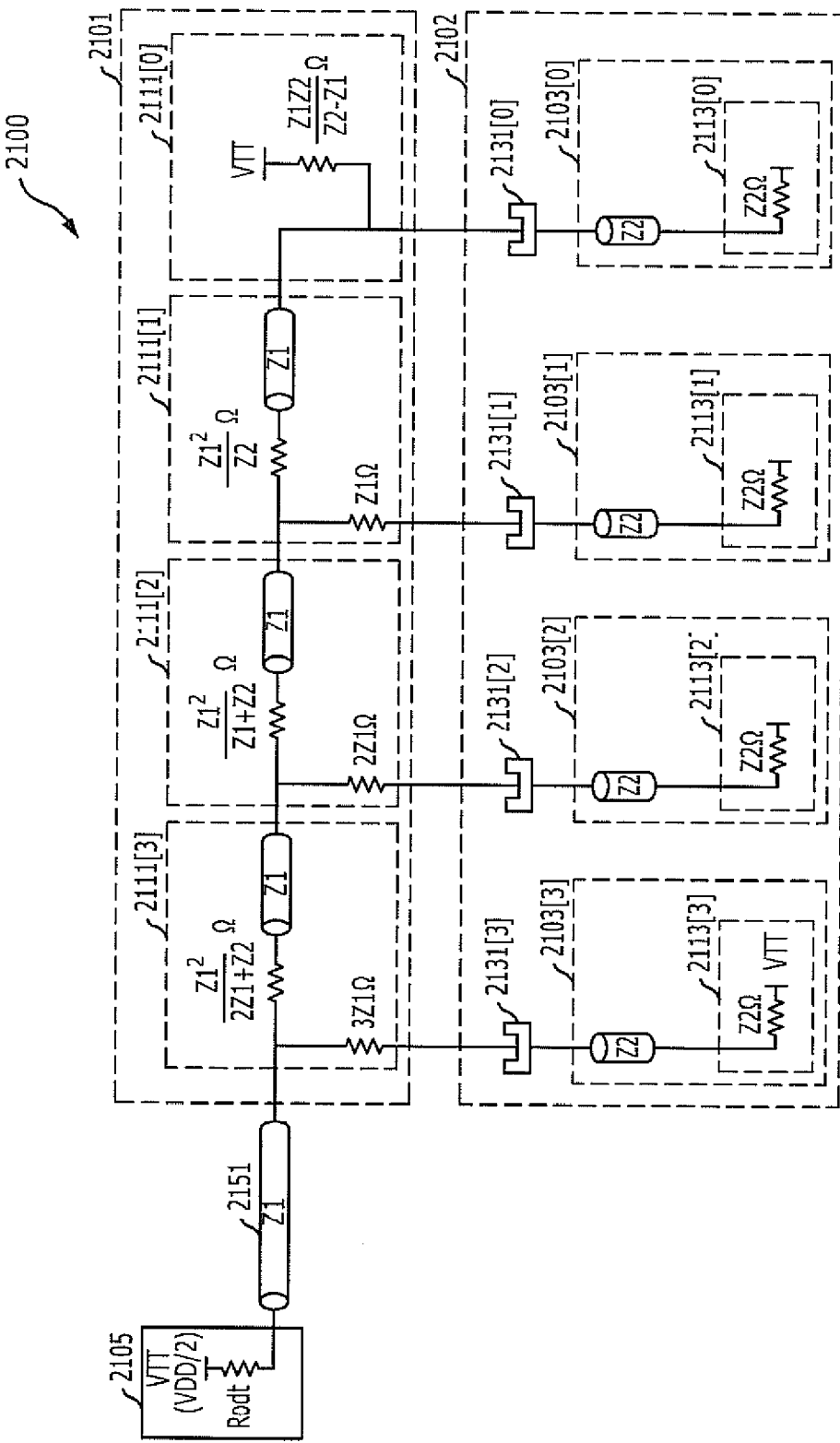
FIG. 11 shows a schematic diagram representing a bi-directional multi-drop bus system in accordance with still another embodiment of the present invention, and a memory module and a memory system using the bi-directional multi-drop bus system when the characteristic impedance of the bi-directional multi-drop bus system is smaller than that of the memory module.

FIG. 11 is a schematic diagram representing a bi-directional multi-drop bus system in accordance with still another embodiment of the present invention, and a memory module and a memory system using the bi-directional multi-drop bus system when the characteristic impedance of the bi-directional multi-drop bus system is smaller than that of the memory module. In this case, the bi-directional multi-drop bus system includes four stubs.

As shown in FIG. 11, a memory system 2100 includes a bi-directional multi-drop bus system 2101, a memory module unit 2102, and a memory controller 2105. The bi-directional multi-drop bus system 2101 is constituted with four stubs 2111[0:3] and four connectors 2131[0:3], each of which is coupled to a corresponding one of the stubs 2111[0:3]. Second terminal of the stub 2111[3] is coupled to the memory controller 2105 through a transmission line 2151. The memory module unit 2102 includes four memory modules 2103[0:3], each of which is coupled to a corresponding one of the connectors 2131[0:3]. Each of the memory modules 2103[0:3] includes a single memory chip, corresponding one out of 2113[0:3]. The memory chips 2113[0:3] are terminated as a characteristic impedance Z2 of the memory module 2103[0:3]; and the memory controller 2105 are terminated as an on-die termination (ODT) load Rodt. The memory controller 2105 is line-matched to characteristic impedance Z1 of the bi-directional multi-drop bus system 2101; and the memory chips 2113[0:3] are line-matched to the characteristic impedance Z2 of the memory module 2103[0:3].

Although the embodiment shown in FIG. 11 includes single memory chip for each memory module, it is also possible to include a plurality of memory chips for each memory module. For example, each of the memory modules includes two memory chips in case of dual rank. The detailed structure of memory module of the dual rank is equivalent those shown in FIGS. 10A and 10B.

In the memory system shown in FIG. 11, each of the stubs 2111[1:3] includes first load Zc[1:3] serially connected to the corresponding one of the connectors 2131[1:3] and second load Zb[1:3] serially connected to the characteristic impedance Z1 of a bus transmission line. The stub[0] does not includes the first second loads Zc[0] and Zb[0]. A parallel resistor of $$\frac{Z1 Z2}{Z2 - Z1}$$

is coupled to the stub 2111[0] for the impedance matching. The first and second loads Zc[n] and Zb[n] are expressed by equation 4:

$$Zc[n] = nZ1, Zc[0] = 0 \quad \text{Equation 4}$$

$$Zb[n] = \frac{Z1^2}{(n+1)Z1 + Z2}$$

By considering the first and second loads Zc[1:3] and Zb[1:3], the equivalent load which is loaded at the second terminal of each stub is the characteristic impedance Z1 of the bi-directional multi-drop bus system 2101. In this case, operational voltages Signalswing$_{write}$ and Signalswing$_{read}$ of the read and write operations, respectively, become the values induced by equation 5:

$$Signalswing_{write} = V_H - V_L \quad \text{Equation 5}$$

$$= \frac{Z2}{2(KZ1 + Z2)}\{V_{TT} + (V_{DD} - V_{TT}) -$$

$$V_{TT} + (V_{TT} - V_{SS})\}$$

$$= \frac{Z2}{2(KZ1 + Z2)}(V_{DD} - V_{SS})$$

$$Signalswing_{read} = V_H - V_L$$

$$= \frac{Z_1}{1(KZ1 + Z2)}\{V_{TT} + (V_{DD} - V_{TT}) -$$

$$V_{TT} + (V_{TT} - V_{SS})\}$$

$$= \frac{Z1}{2(KZ1 + Z2)}(V_{DD} - V_{SS})$$

The memory system in accordance with an embodiment of the present invention shown in FIG. 11, it is possible to transmit write signal to the memory modules 2103[0:3] without the reflected wave for write operation and to transmit read signal to the memory controller 2105 without the reflected wave causing ISI for the read operation. Therefore, the memory system in accordance with the embodiment of the present invention improves the signal integrity of the bi-directional multi-drop bus system.

Figure 12:
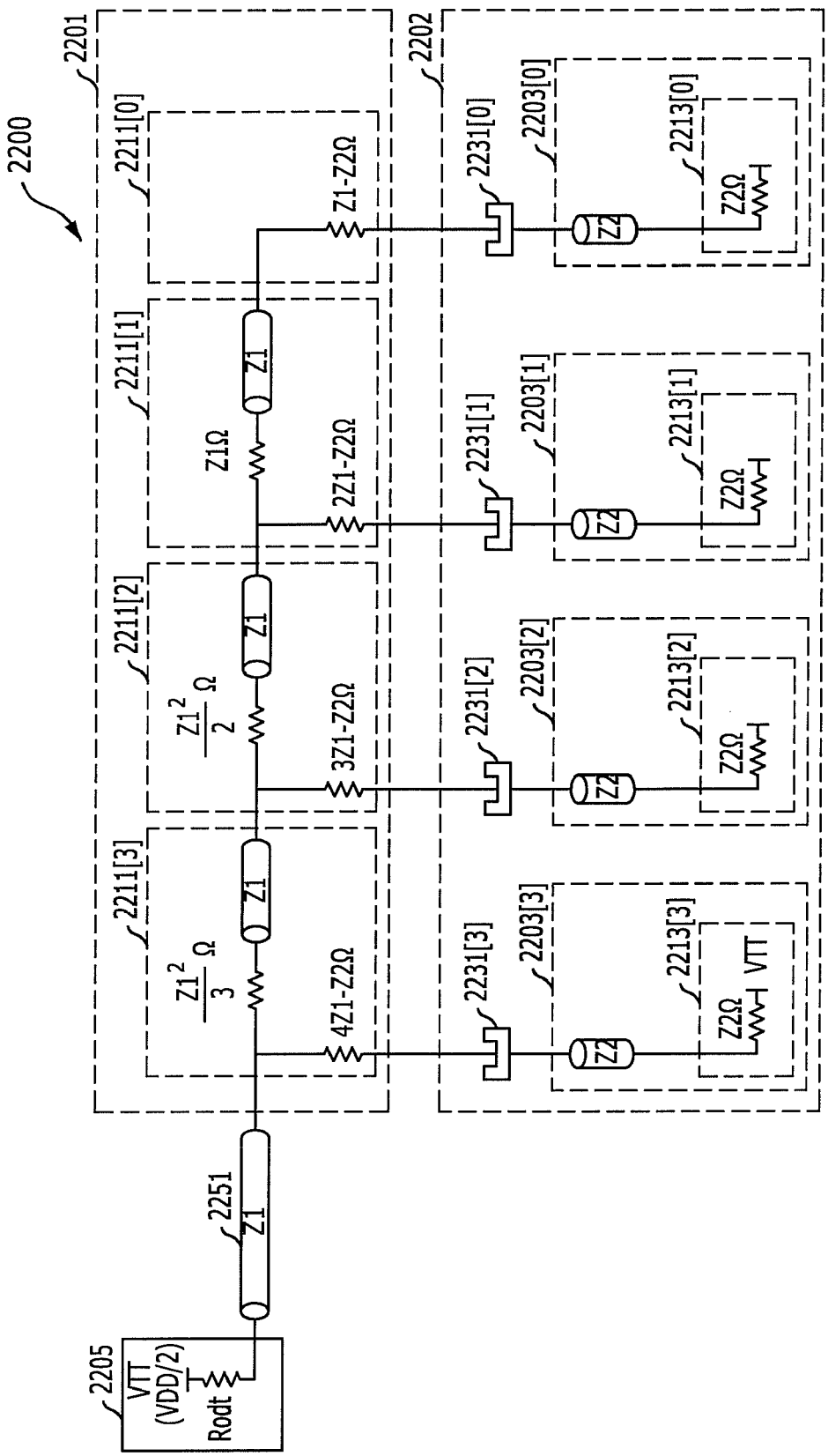
FIG. 12 shows a schematic diagram representing a bi-directional multi-drop bus system in accordance with a further embodiment of the present invention, and a memory module and a memory system using the bi-directional multi-drop bus system when the characteristic impedance of the bi-directional multi-drop bus system is greater than that of the memory module.

FIG. 12 is a schematic diagram representing a bi-directional multi-drop bus system in accordance with a further embodiment of the present invention, and a memory module and a memory system using the bi-directional multi-drop bus system when the characteristic impedance of the bi-directional multi-drop bus system is greater than that of the memory module. In this case, the bi-directional multi-drop bus system includes four stubs.

As shown in FIG. 12, a memory system 2200 includes a bi-directional multi-drop bus system 2201, a memory module unit 2202, and a memory controller 2205. The bi-directional multi-drop bus system 2201 is constituted with four stubs 2211[0:3] and four connectors 2231[0:3], each of which is coupled to a corresponding one of the stubs 2211[0:3]. Second terminal of the stub 2211[3] is coupled to the memory controller 2205 through a transmission line 2251. The memory module unit 2202 includes four memory modules 2203[0:3], each of which is coupled to a corresponding one of the connectors 2231[0:3]. Each of the memory modules 2203[0:3] includes a single memory chip, corresponding one of memory chips 2213[0:3]. The memory chips 2213[0:3] are terminated as a characteristic impedance Z2 of the memory module 2203[0:3]; and the memory controller 2205 are terminated as the ODT load Rodt. The memory controller 2205 is line-matched to characteristic impedance Z1 of the bi-directional multi-drop bus system 2201; and the memory chips 2213[0:3] are line-matched to the characteristic impedance Z2 of the memory module 2203[0:3].

Although the embodiment shown in FIG. 12 includes single memory chip for each memory module, it is also possible to include a plurality of memory chips for each memory module. For example, each of the memory modules includes two memory chips in case of dual rank. The detailed structure of memory module of the dual rank is equivalent those shown in FIGS. 10A and 10B.

In the memory system shown in FIG. 12, each of the stubs 2211[1:3] includes first load Zc[1:3] serially connected to the corresponding one of the connectors 2231[1:3] and second load Zb[1:3] serially connected to the characteristic impedance Z1 of a bus transmission line. The stub 2211[0] does not includes the first second loads Zc[0] and Zb[0]. A serial resistor of Z1-Z2 is coupled to the stub 2211[0] for the impedance matching. The first and second loads Zc[n] and Zb[n] are expressed by equation 6:

$$Zc[n] = (n+1)Z1 - Z2 \qquad \text{Equation 6}$$
$$Zb[n] = \frac{Z1}{n}$$

By considering the first and second loads Zc[1:3] and Zb[1:3], the equivalent load which is loaded at the second terminal of each stub is the characteristic impedance Z1 of the bi-directional multi-drop bus system 2101. In this case, operational voltages Signalswing$_{write}$ and Signalswing$_{read}$ of the read and write operations, respectively, become the value induced by equation 7:

$$\begin{aligned} Signalswing_{write} &= V_H - V_L \qquad \text{Equation 7}\\ &= \frac{Z2}{2(K+1)Z1}\{V_{TT} + (V_{DD} - V_{TT}) - \\ &\quad V_{TT} + (V_{TT} - V_{SS})\}\\ &= \frac{Z2}{2(K+1)Z1}(V_{DD} - V_{SS}) \end{aligned}$$

$$\begin{aligned} Signalswing_{read} &= V_H - V_L \\ &= \frac{1}{2(K+1)}\{V_{TT} + (V_{DD} - V_{TT}) - \\ &\quad V_{TT} + (V_{TT} - V_{SS})\}\\ &= \frac{1}{2(K+1)}(V_{DD} - V_{SS}) \end{aligned}$$

The memory system in accordance with an embodiment of the present invention shown in FIG. 12, it is possible to transmit a write signal to the memory modules 2203[0:3] without the reflected wave for write operation and to transmit read signal to the memory controller 2205 without the reflected wave causing ISI for the read operation. Therefore, the memory system in accordance with the embodiment of the present invention improves the signal integrity of the bi-directional multi-drop bus system.

Hereinafter, a simulation result of the test for the signal integrity in accordance with the present invention is illustrated.

FIGS. 13A to 13D are diagrams illustrating models used for testing of the signal integrity of the bi-directional multi-drop bus system.

Figure 13A:
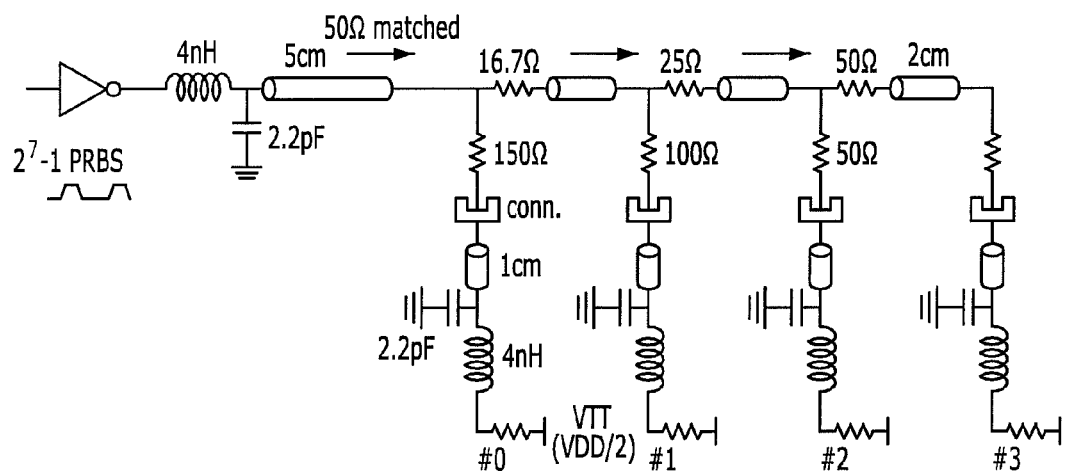
FIGS. 13A to 13D show diagrams illustrating models used for testing of the signal integrity of the bi-directional multi-drop bus system.
Figure 13B:
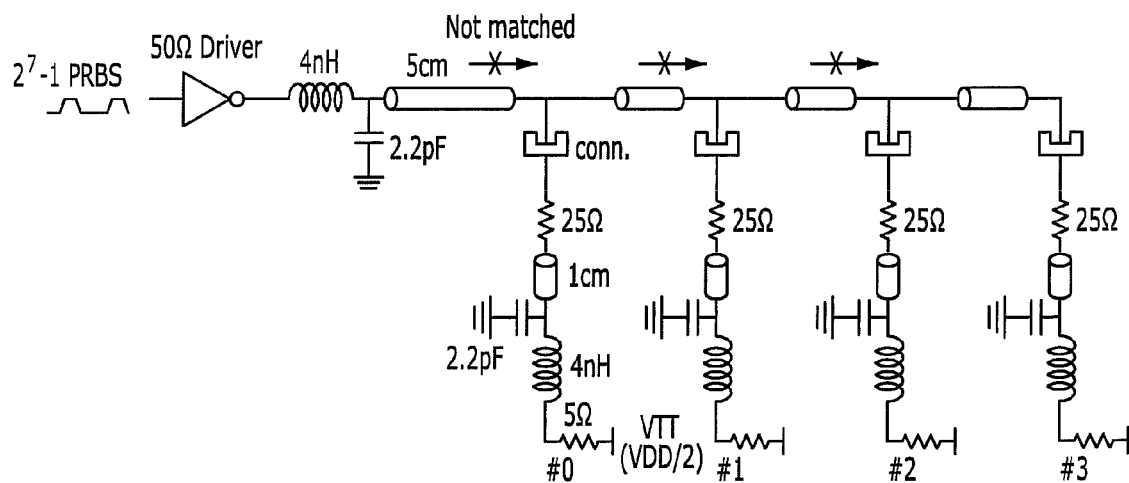
Figure 13C:
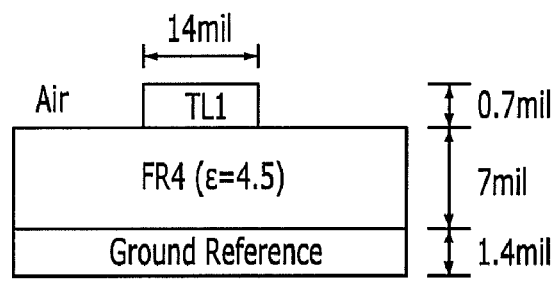
Figure 13D:
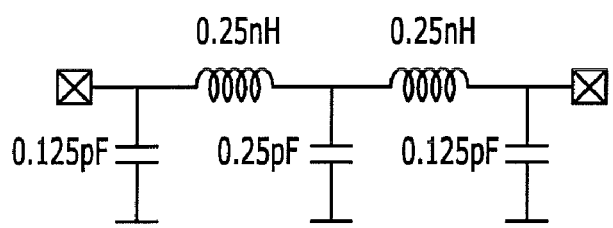

FIG. 13A is a schematic diagram representing a memory system using a bi-directional multi-drop bus system in accordance with an embodiment of the present invention. FIG. 13B is a schematic diagram representing a conventional memory system using a multi-drop bus system employing a SSTL signaling method. The memory chips and memory modules of the memory system shown in FIG. 13B are on-die terminated in order to make the comparison with the present invention of FIG. 13A for illustration. FIG. 13C is a diagram illustrating RLGC model of the PCB trace. The RLGC are the transmission line parameters as known to those skilled in the art. In detail, R denotes the resistance per unit length; L denotes the inductance per unit length; G denotes the conductance per unit length; and C denotes the capacitance per unit length. FIG. 13D is a schematic circuit diagram illustrating a connector model.

FIGS. 14A-14D are eye diagrams showing the simulation results for the write operation of the memory systems shown in FIGS. 13A to 13D.

Figure 14A:
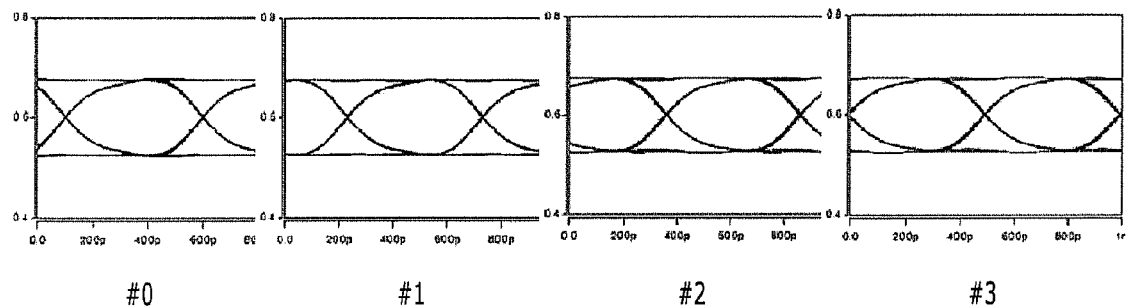
FIGS. 14A and 14D show eye diagrams showing the simulation results for the write operation of the memory systems shown in FIGS. 13A to 13D.
Figure 14B:
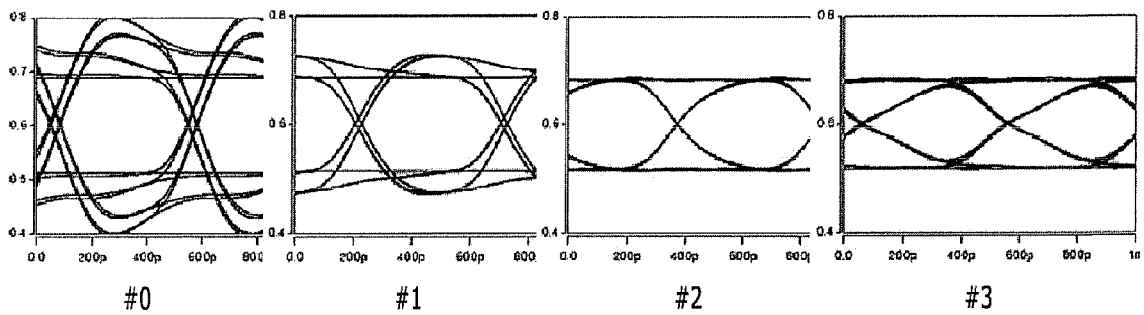
Figure 14C:
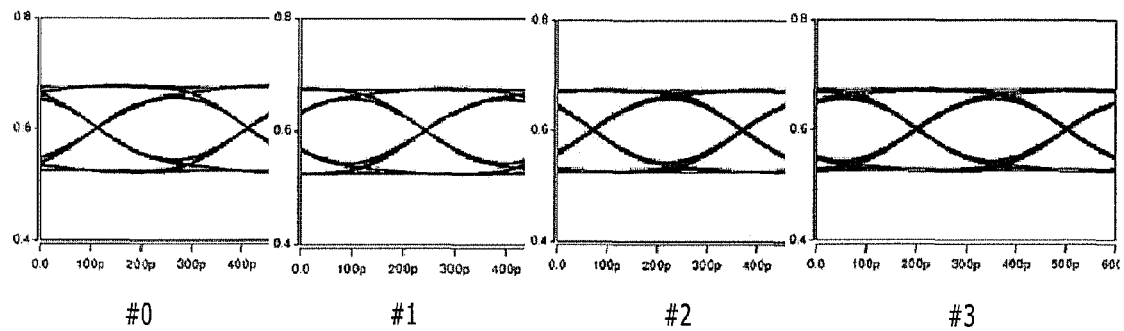

FIG. 14A depicts the case where the test for the write operation is performed to the memory system of 2 Gbps bandwidth in accordance with present invention shown in FIG. 13A; FIG. 14B depicts the case where the test for the write operation is performed to the conventional memory system of 2 Gbps bandwidth shown in FIG. 13B; FIG. 14C depicts the case where the test for the read operation is performed to the memory system of 3.3 Gbps bandwidth in accordance with the present invention shown in FIG. 13A; and FIG. 14D depicts the case where the test for the read operation is performed to the conventional memory system of 3.3 Gbps bandwidth shown in FIG. 13B.

Figure 14D:
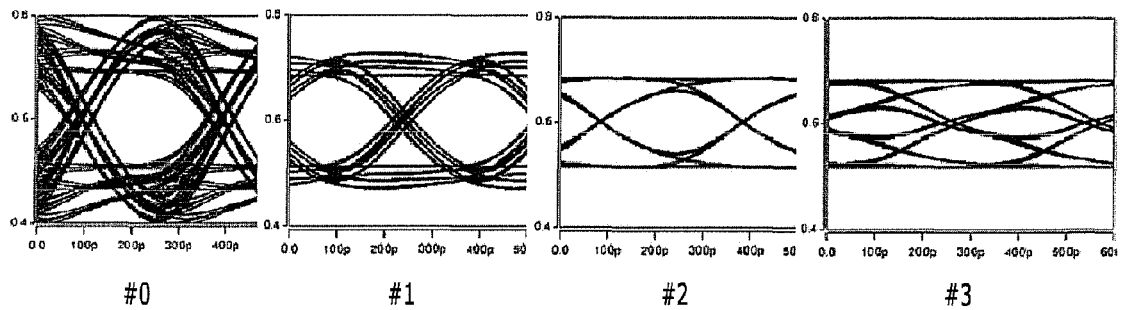

In case of the conventional memory system shown in FIGS. 14B and 14D, the results for each of memory modules #0~3 are inconsistent. Further, as the bandwidth of the memory system is increased, the signal distortion becomes severe. On the contrary, the results shown in FIGS. 14A and 14C show that the signals written in each memory modules of the memory system in accordance with the present invention are almost uniform. Also, when the bandwidth of the memory system is increased, the signal is correctly transmitted at least up to 3.3 Gbps. This is because the present invention removes the reflected wave causing ISI.

FIGS. 15A-15D are eye diagrams showing the simulation results for the read operation of the memory systems shown in FIGS. 13A to 13D.

Figure 15A:
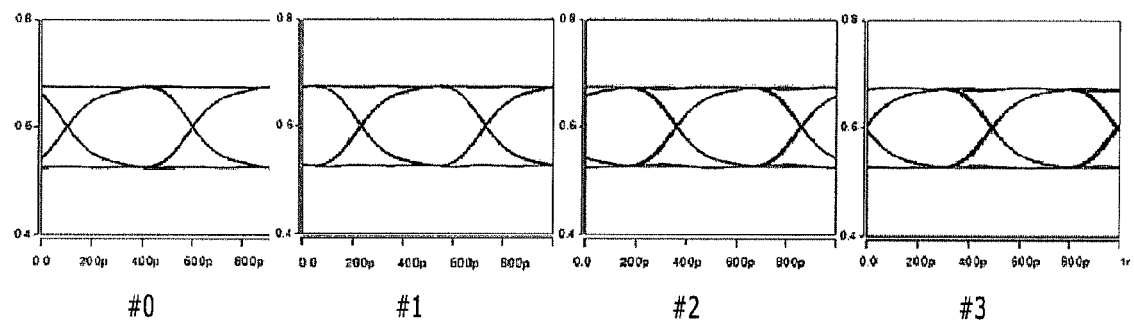
FIGS. 15A and 15D show eye diagrams showing the simulation results for the read operation of the memory systems shown in FIGS. 13A to 13D.
Figure 15B:
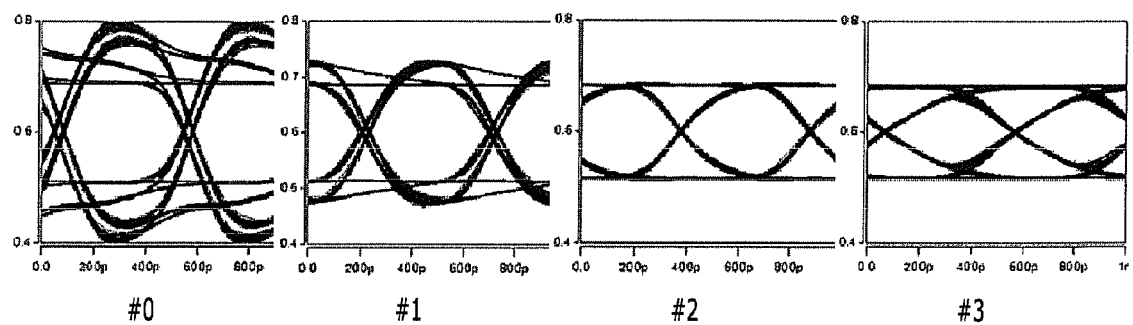
Figure 15C:
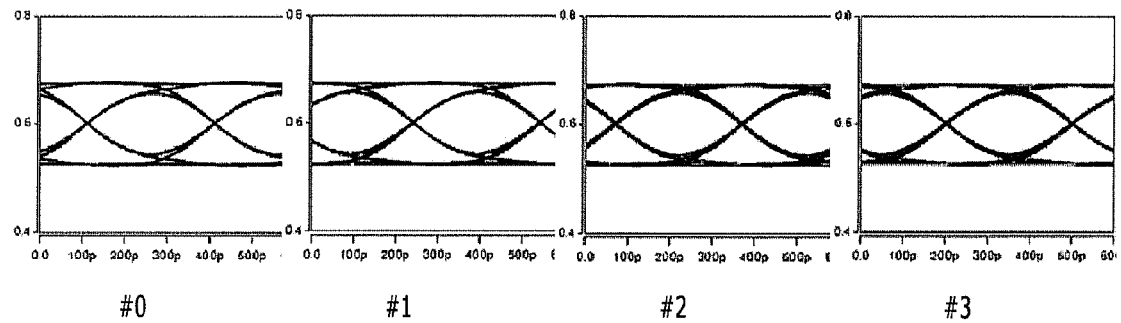
Figure 15D:
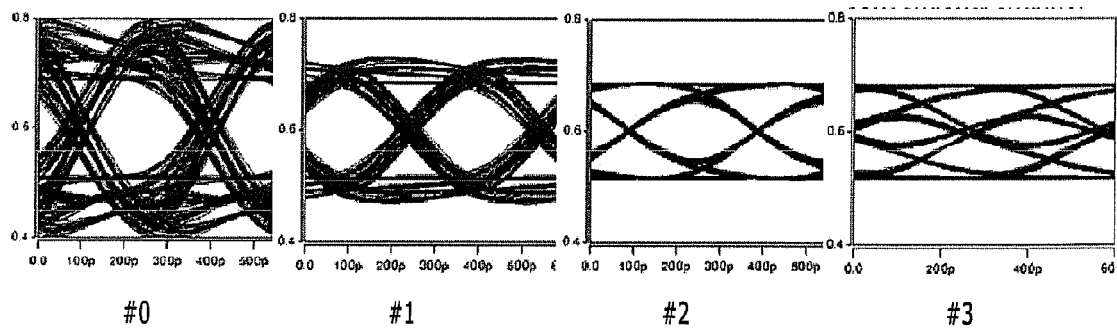

FIG. 15A depicts the case where the test for the read operation is performed to the memory system of 2 Gbps bandwidth in accordance with present invention shown in FIG. 13A; FIG. 15B depicts the case where the test for the read operation is performed to the conventional memory system of 2 Gbps bandwidth shown in FIG. 13B; FIG. 15C depicts the case where the test for the read operation is performed to the memory system of 3.3 Gbps bandwidth in accordance with the present invention shown in FIG. 13A; and FIG. 15D depicts the case where the test for the read operation is performed to the conventional memory system of 3.3 Gbps bandwidth shown in FIG. 13B.

The simulation results for the read operation shown in FIGS. 15A to 15D are similar to those for the write operation shown in FIGS. 14A to 14D. That is, the conventional memory system shows inconsistent results for each memory modules #0~3 and severe signal distortion as the bandwidth is increased. Meanwhile, the memory system in accordance with the present invention shows almost uniform results for each memory modules #0~3 and correct signal transmission regardless of an increase of the bandwidth at least up to 3.3 Gbps.

Embodiments of the present invention relate to a bi-directional multi-drop bus system which is capable to eliminate the reflected wave causing the ISI, and a memory module and memory system using the bi-directional multi-drop bus system.

While the present invention has been described with respect to the specific embodiments, it will be apparent to those skilled in the art that various changes and modifications may be made without departing from the spirit and scope of the invention as defined in the following claims.

What is claimed is:

1. A bus system, comprising:
a plurality of stubs;
a plurality of connectors, each of which is serially coupled to a corresponding one of the stubs;
a plurality of first serial loads, each of which is serially coupled to a corresponding one of the connectors; and
a plurality of second serial loads, each of which is serially coupled to characteristic impedance of a transmission line of a corresponding one of the stubs,
wherein the first and second serial loads are determined by the following equation:

$$Zc[n] = nZ0$$
$$Zb[n] = Z0/n, Zb[0] = 0$$

where, Zc[n] denotes the first serial loads; the Zb[n] denotes the second serial loads; n denotes an index allocated for each of the stubs and has '0' or a positive integer; and Z0 denotes a characteristic impedance of the bus system.

2. The bus system of claim 1, wherein a plurality of memory modules, each of which includes at least one memory chip, are correspondingly coupled to the stubs through the corresponding connectors; and a memory controller is coupled to the bus system.

3. The bus system of claim 2, wherein the memory chips and the memory controller are on-die terminated.

4. The bus system of claim 2, wherein each of the memory chips includes a signal driver that are line-matched with the memory modules.

5. The bus system of claim 2, wherein the memory controller includes a signal driver that is line-matched with the bus system.

6. The bus system of claim 2, wherein the first and second serial loads are implemented with a printed circuit board (PCB) embedded load.

7. The bus system of claim 2, wherein each of the memory modules includes:
a first load, coupled to a corresponding one of the connectors, having a characteristic impedance of the memory modules;
a second load, coupled to the first load, having an equivalent impedance with the first load;
a first memory chip coupled to the second load;
a third load, coupled in parallel with the second load, having the equivalent impedance with the first load;
a second memory chip coupled to the third load; and
a fourth load, serially coupled between the first load and a common node of the second and third loads, having a half impedance of the first load.

8. A bus system, comprising:
a plurality of stubs;
a plurality of connectors, each of which is serially coupled between a corresponding one of the stubs and a corresponding one of memory modules;
a plurality of first serial loads, each of which is serially coupled to a corresponding one of the connectors;
a plurality of second serial loads, each of which is serially coupled to characteristic impedance of a transmission line of a corresponding one of the stubs; and
a parallel resistor of $$\frac{Z1Z2}{Z2-Z1}$$

connected to a final one of the stubs,
wherein the first and second serial loads are determined by the following equation:

$$Zc[n] = nZ1, Zc[0] = 0$$
$$Zb[n] = \frac{Z1^2}{(n+1)Z1+Z2}$$

where, Zc[n] denotes the first serial loads; the Zb[n] denotes the second serial loads; n denotes an index allocated for each of the stubs and has a positive integer; Z1 denotes a characteristic impedance of the bus system; and Z2 denotes a characteristic impedance of the memory module.

9. The bus system of claim 8, wherein an on-die terminated memory controller is coupled to the bus system.

10. The bus system of claim 8, wherein each of the memory modules includes at least one on-die terminated memory chip that is line-matched with the memory module.

11. The bus system of claim 9, wherein the on-die terminated memory controller includes a signal driver that is line-matched with the bus system.

12. The bus system of claim 8, wherein the first and second serial loads are implemented with a PCB embedded load.

13. The bus system of claim 8, wherein each of the memory modules includes:
a first load, coupled to a corresponding one of the connectors, having a characteristic impedance of the memory modules;
a second load, coupled to the first load, having an equivalent impedance with the first load;
a first memory chip coupled to the second load;
a third load, coupled in parallel with the second load, having the equivalent impedance with the first load;
a second memory chip coupled to the third load; and
a fourth load, serially coupled between the first load and a common node of the second and third loads, having a half impedance of the first load.

14. A bus system, comprising:
a plurality of stubs;
a plurality of connectors, each of which is serially coupled between a corresponding one of the stubs and a corresponding one of memory modules;
a plurality of first serial loads, each of which is serially coupled to a corresponding one of the connectors; and
a plurality of second serial loads, each of which is serially coupled to characteristic impedance of a transmission line of a corresponding one of the stubs,
wherein the first and second serial loads are determined by the following equation:

$$Zc[n] = (n+1)Z1 - Z2$$
$$Zb[n] = \frac{Z1}{n}$$

where, $Zc[n]$ denotes the first serial loads; the $Zb[n]$ denotes the second serial loads; n denotes an index allocated for each of the stubs and has '0' or a positive integer; Z1 denotes a characteristic impedance of the bus system; and Z2 denotes a characteristic impedance of the memory module.

15. The bus system of claim 14, wherein an on-die terminated memory controller is coupled to the bus system.

16. The bus system of claim 14, wherein each of the memory modules includes at least one on-die terminated memory chip that is line-matched with the memory module.

17. The bus system of claim 15, wherein the on-die terminated memory controller includes a signal driver that is line-matched with the bus system.

18. The bus system of claim 14, wherein the first and second serial loads are implemented with a PCB embedded load.

19. The bus system of claim 14, wherein each of the memory modules includes:
a first load, coupled to a corresponding one of the connectors, having a characteristic impedance of the memory modules;
a second load, coupled to the first load, having an equivalent impedance with the first load;
a first memory chip coupled to the second load;
a third load, coupled in parallel with the second load, having the equivalent impedance with the first load;
a second memory chip coupled to the third load; and
a fourth load, serially coupled between the first load and a common node of the second and third loads, having a half impedance of the first load.

20. A memory system, comprising:
a plurality of stubs;
a plurality of connectors, each of which is serially coupled between a corresponding one of the stubs and a corresponding one of memory modules;
a plurality of first serial loads, each of which is serially coupled to a corresponding one of the connectors; and
a plurality of second serial loads, each of which is serially coupled to characteristic impedance of a transmission line of a corresponding one of the stubs,
wherein the first and second serial loads are determined by the following equation:

$$Zc[n] = nZ0$$
$$Zb[n] = Z0/n, Zb[0] = 0$$

where, $Zc[n]$ denotes the first serial loads; the $Zb[n]$ denotes the second serial loads; n denotes an index allocated for each of the stubs and has '0' or a positive integer; and Z0 denotes the characteristic impedance of the transmission line.

21. A memory system, comprising:
a plurality of stubs;
a plurality of connectors, each of which is serially coupled between a corresponding one of the stubs and a corresponding one of memory modules;
a plurality of first serial loads, each of which is serially coupled to a corresponding one of the connectors;
a plurality of second serial loads, each of which is serially coupled to characteristic impedance of a transmission line of a corresponding one of the stubs; and
a parallel resistor of $$\frac{Z1Z2}{Z2 - Z1}$$

connected to the final stub,
wherein the first and second serial loads are determined by the following equation:

$$Zc[n] = nZ1, Zc[0] = 0$$
$$Zb[n] = \frac{Z1^2}{(n+1)Z1 + Z2}$$

where, $Zc[n]$ denotes the first serial loads; the $Zb[n]$ denotes the second serial loads; n denotes an index allocated for each of the stubs and has a positive integer; Z1 denotes the characteristic impedance of the transmission line; and Z2 denotes a characteristic impedance of the memory module.

22. A memory system, comprising:
a plurality of stubs;
a plurality of connectors, each of which is serially coupled between a corresponding one of the stubs and a corresponding one of memory modules;
a plurality of first serial loads, each of which is serially coupled to a corresponding one of the connectors; and
a plurality of second serial loads, each of which is serially coupled to characteristic impedance of a transmission line of a corresponding one of the stubs,
wherein the first and second serial loads are determined by the following equation:

$$Zc[n] = (n+1)Z1 - Z2$$
$$Zb[n] = \frac{Z1}{n}$$

where, $Zc[n]$ denotes the first serial loads; the $Zb[n]$ denotes the second serial loads; n denotes an index allocated for each of the stubs and has '0' or a positive integer; Z1 denotes the characteristic impedance of the transmission line; and Z2 denotes a characteristic impedance of the memory module.

* * * * *